US012665639B2

(12) United States Patent
Ly et al.

(10) Patent No.: US 12,665,639 B2
(45) Date of Patent: Jun. 23, 2026

(54) CHANNEL STATE INFORMATION CODEBOOK PARAMETER CONFIGURATION FOR DYNAMIC ANTENNA PORT ADAPTATION

(71) Applicant: QUALCOMM Incorporated, San Diego, CA (US)

(72) Inventors: Hung Dinh Ly, San Diego, CA (US); Yu Zhang, San Diego, CA (US); Ahmed Attia Abotabl, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 723 days.

(21) Appl. No.: 17/862,630

(22) Filed: Jul. 12, 2022

(65) Prior Publication Data

US 2024/0030978 A1 Jan. 25, 2024

(51) Int. Cl.
*H04B 7/06* (2006.01)
*H04B 7/0456* (2017.01)

(52) U.S. Cl.
CPC ......... *H04B 7/0626* (2013.01); *H04B 7/0482* (2013.01); *H04B 7/0486* (2013.01); *H04B 7/0639* (2013.01)

(58) Field of Classification Search
CPC .. H04B 7/0626; H04B 7/0482; H04B 7/0486; H04B 7/0639; H04B 7/0621; H04B 7/0663; H04B 7/0478
See application file for complete search history.

(56) References Cited

U.S. PATENT DOCUMENTS

| | | | | |
|---|---|---|---|---|
| 2011/0194631 A1* | 8/2011 | Clerckx | ............ | H04L 25/03343 375/260 |
| 2016/0294454 A1* | 10/2016 | Onggosanusi | ....... | H04B 7/0482 |
| 2016/0323022 A1* | 11/2016 | Rahman | ............... | H04B 7/0478 |
| 2019/0199420 A1* | 6/2019 | Faxér | .................... | H04L 1/0026 |
| 2020/0067631 A1* | 2/2020 | Kakishima | .............. | H04L 5/005 |
| 2020/0245333 A1* | 7/2020 | Lin | ........................ | H04L 1/0026 |

(Continued)

FOREIGN PATENT DOCUMENTS

| | | | | |
|---|---|---|---|---|
| CN | 111294145 A | * | 6/2020 | ........... H04L 1/0693 |

OTHER PUBLICATIONS

International Search Report and Written Opinion—PCT/US2023/026679—ISA/EPO—Oct. 16, 2023.

*Primary Examiner* — Liem H. Nguyen
(74) *Attorney, Agent, or Firm* — Holland & Hart LLP

(57) ABSTRACT

Methods, systems, and devices for wireless communication are described. A user equipment (UE) may receive a channel state information (CSI) report configuration from a network entity. The CSI report configuration may include a first set of codebook parameters associated with at least a first codebook. The first codebook may be associated with a CSI measurement at the UE. The UE may determine one or more additional sets of codebook parameters associated with one or more additional codebooks based on the first set of codebook parameters associated with the first codebook. The UE may transmit a CSI report including a respective set of CSI parameters for each of the first codebook and the one or more of the additional codebooks based on the first set of codebook parameters, the one or more additional sets of codebook parameters, and a CSI computation at the UE.

30 Claims, 17 Drawing Sheets

(56) References Cited

U.S. PATENT DOCUMENTS

| | | | | |
|---|---|---|---|---|
| 2020/0304178 A1* | 9/2020 | Wei | .................. | H04B 7/0617 |
| 2021/0234585 A1* | 7/2021 | Rahman | .............. | H04B 7/0478 |
| 2021/0320704 A1* | 10/2021 | Hao | .................. | H04B 7/0632 |
| 2021/0391909 A1* | 12/2021 | Lee | .................. | H04B 7/063 |
| 2021/0409991 A1* | 12/2021 | Park | .................. | H04L 5/0057 |
| 2022/0338189 A1* | 10/2022 | Madadi | ............. | H04B 17/3913 |
| 2023/0246759 A1* | 8/2023 | Yuan | .................. | H04B 7/0632 |
| | | | | 370/329 |
| 2024/0056147 A1* | 2/2024 | Faxer | .................. | H04L 5/005 |
| 2024/0187128 A1* | 6/2024 | Fröberg Olsson | ...... | H04L 1/005 |

* cited by examiner $(N_1', N_2', O_1', O_2') = (2, 1, 4, 1)$ $(N_1, N_2, O_1, O_2) = (2, 2, 4, 4)$ PMI Restriction

130

105

115

Network
Entity

Transceiver

Antenna

1410

1415

Communications
Manager

Memory

Code

1430

1420

1425

1440

Processor

1435

1405

1400

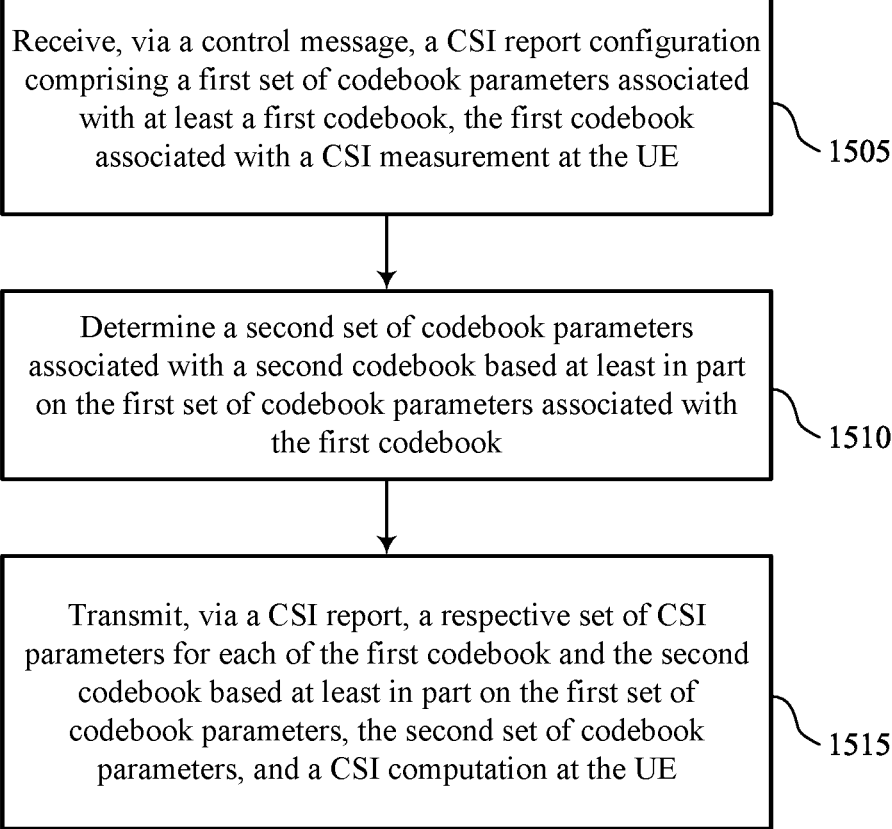

Receive, via a control message, a CSI report configuration comprising a first set of codebook parameters associated with at least a first codebook, the first codebook associated with a CSI measurement at the UE

1505

Determine a second set of codebook parameters associated with a second codebook based at least in part on the first set of codebook parameters associated with the first codebook

1510

Transmit, via a CSI report, a respective set of CSI parameters for each of the first codebook and the second codebook based at least in part on the first set of codebook parameters, the second set of codebook parameters, and a CSI computation at the UE

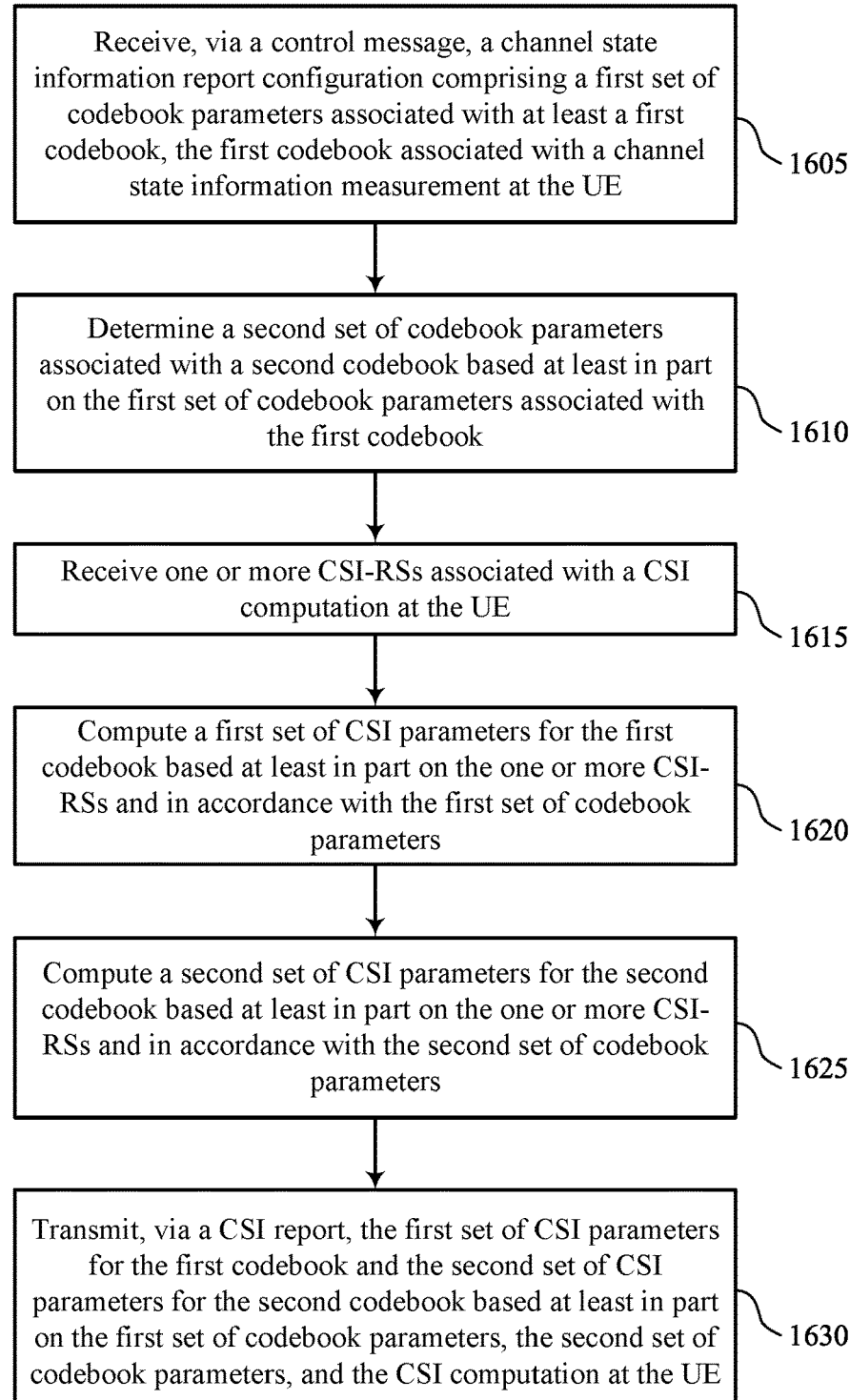

Receive, via a control message, a channel state information report configuration comprising a first set of codebook parameters associated with at least a first codebook, the first codebook associated with a channel state information measurement at the UE

1605

Determine a second set of codebook parameters associated with a second codebook based at least in part on the first set of codebook parameters associated with the first codebook

1610

Receive one or more CSI-RSs associated with a CSI computation at the UE

1615

Compute a first set of CSI parameters for the first codebook based at least in part on the one or more CSI-RSs and in accordance with the first set of codebook parameters

1620

Compute a second set of CSI parameters for the second codebook based at least in part on the one or more CSI-RSs and in accordance with the second set of codebook parameters

1625

Transmit, via a CSI report, the first set of CSI parameters for the first codebook and the second set of CSI parameters for the second codebook based at least in part on the first set of codebook parameters, the second set of codebook parameters, and the CSI computation at the UE

Figure 17:
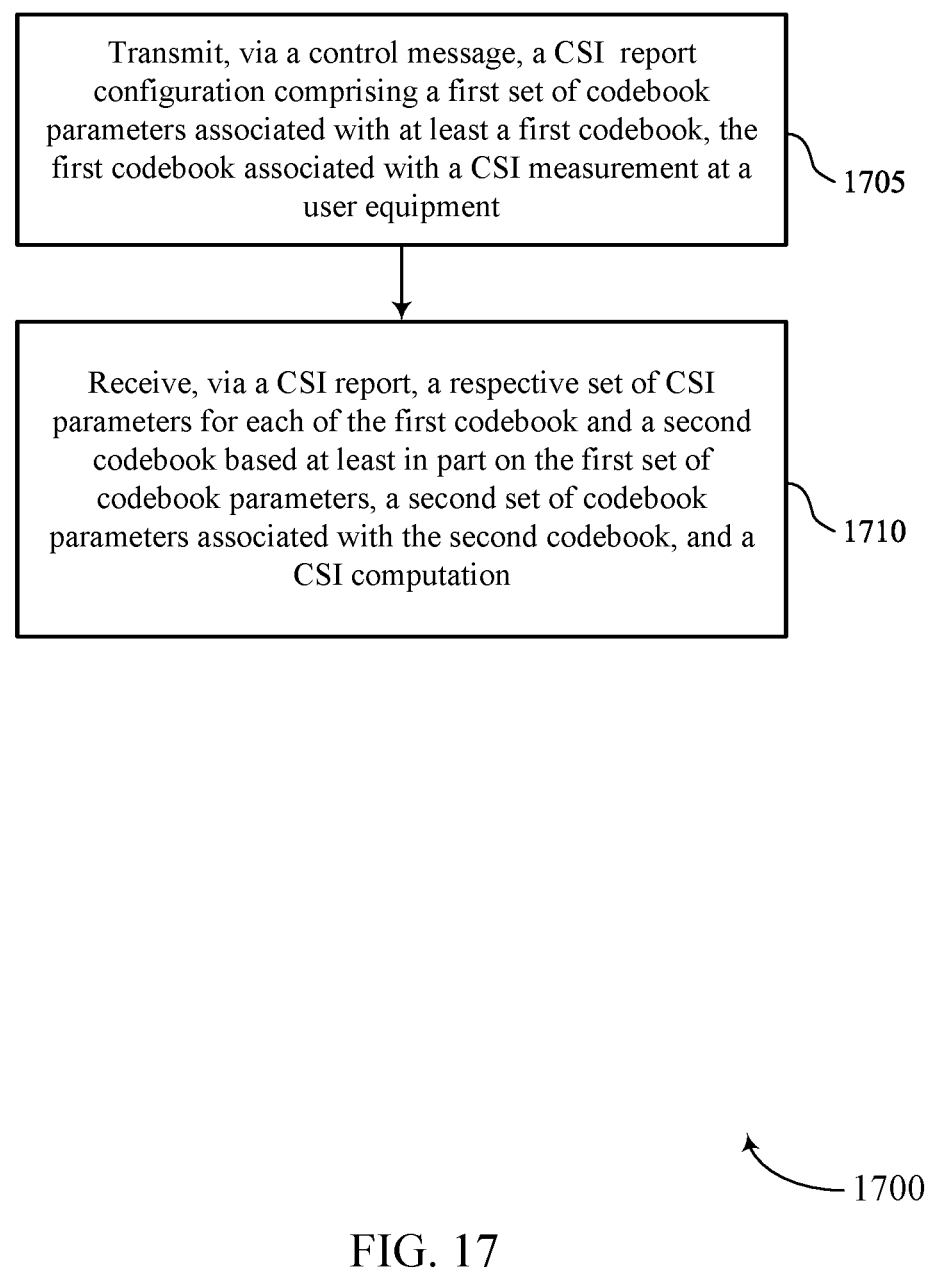

```
┌─────────────────────────────────────────┐
│   Transmit, via a control message, a CSI report │
│  configuration comprising a first set of codebook │
│ parameters associated with at least a first codebook, the │      1705
│ first codebook associated with a CSI measurement at a │
│                user equipment             │
└─────────────────────────────────────────┘
                     │
                     ▼
┌─────────────────────────────────────────┐
│    Receive, via a CSI report, a respective set of CSI │
│   parameters for each of the first codebook and a second │
│    codebook based at least in part on the first set of │
│       codebook parameters, a second set of codebook │      1710
│  parameters associated with the second codebook, and a │
│                CSI computation            │
└─────────────────────────────────────────┘
```

CHANNEL STATE INFORMATION CODEBOOK PARAMETER CONFIGURATION FOR DYNAMIC ANTENNA PORT ADAPTATION

FIELD OF TECHNOLOGY

The following relates to wireless communication, including channel state information (CSI) codebook parameter configuration for dynamic antenna port adaptation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

A UE may measure or compute channel state information (CSI) parameters based on a set of codebook parameters. The UE may transmit a CSI report to a network entity to indicate the CSI parameters.

SUMMARY

The described techniques relate to improved methods, systems, devices, and apparatuses that support channel state information (CSI) codebook parameter configuration for dynamic antenna port adaptation. For example, the described techniques provide for a user equipment (UE) to derive codebook parameters for one or more additional codebooks based on codebook parameters configured via a CSI report configuration for a first codebook. The UE may receive, from a network entity, the CSI report configuration, which may include a set of codebook parameters associated with at least the first codebook, which may be referred to as a base codebook. The UE may determine additional sets of codebook parameters associated with the one or more additional codebooks (e.g., supplemental codebooks) based on the codebook parameters associated with the first codebook. In some aspects, the UE may determine the additional codebook parameters based on a rule for codebook parameter adaptation. The UE may transmit a CSI report including a set of CSI parameters for each of the first codebook and the one or more of the additional codebooks based on the first set of codebook parameters, the additional sets of codebook parameters, and a CSI computation at the UE.

A method for wireless communication at a UE is described. The method may include receiving, via a control message, a CSI report configuration including a first set of codebook parameters associated with at least a first codebook, the first codebook associated with a CSI measurement at the UE, determining a second set of codebook parameters associated with a second codebook based on the first set of codebook parameters associated with the first codebook, and transmitting, via a CSI report, a respective set of CSI parameters for each of the first codebook and the second codebook based on the first set of codebook parameters, the second set of codebook parameters, and a CSI computation at the UE.

An apparatus for wireless communication at a UE is described. The apparatus may include a processor, memory coupled with the processor, and instructions stored in the memory. The instructions may be executable by the processor to cause the apparatus to receive, via a control message, a CSI report configuration including a first set of codebook parameters associated with at least a first codebook, the first codebook associated with a CSI measurement at the UE, determine a second set of codebook parameters associated with a second codebook based on the first set of codebook parameters associated with the first codebook, and transmit, via a CSI report, a respective set of CSI parameters for each of the first codebook and the second codebook based on the first set of codebook parameters, the second set of codebook parameters, and a CSI computation at the UE.

Another apparatus for wireless communication at a UE is described. The apparatus may include means for receiving, via a control message, a CSI report configuration including a first set of codebook parameters associated with at least a first codebook, the first codebook associated with a CSI measurement at the UE, means for determining a second set of codebook parameters associated with a second codebook based on the first set of codebook parameters associated with the first codebook, and means for transmitting, via a CSI report, a respective set of CSI parameters for each of the first codebook and the second codebook based on the first set of codebook parameters, the second set of codebook parameters, and a CSI computation at the UE.

A non-transitory computer-readable medium storing code for wireless communication at a UE is described. The code may include instructions executable by a processor to receive, via a control message, a CSI report configuration including a first set of codebook parameters associated with at least a first codebook, the first codebook associated with a CSI measurement at the UE, determine a second set of codebook parameters associated with a second codebook based on the first set of codebook parameters associated with the first codebook, and transmit, via a CSI report, a respective set of CSI parameters for each of the first codebook and the second codebook based on the first set of codebook parameters, the second set of codebook parameters, and a CSI computation at the UE.

In some examples of the method, apparatuses, and non-transitory computer-readable medium described herein, transmitting the respective sets of CSI parameters may include operations, features, means, or instructions for transmitting, via the CSI report, a first set of CSI parameters including first wideband CSI parameters associated with the first codebook and first subband CSI parameters associated with the first codebook and transmitting, via the CSI report, a second set of CSI parameters including second wideband CSI parameters associated with the second codebook, where the first set of CSI parameters and the second set of CSI parameters include at least channel quality indicator (CQI) parameters, precoding matrix indicator (PMI) parameters, or both.

Some examples of the method, apparatuses, and non-transitory computer-readable medium described herein may further include operations, features, means, or instructions for receiving a control signal that indicates the first codebook may be a base codebook, where transmitting both the first wideband CSI parameters and the first subband CSI parameters associated with the first codebook may be based on the indication that the first codebook may be the base codebook.

Some examples of the method, apparatuses, and non-transitory computer-readable medium described herein may further include operations, features, means, or instructions for determining that the first codebook may be a base codebook based on a first quantity of antenna ports associated with the first codebook, a second quantity of antenna ports associated with the second codebook, and a rule for base codebook selection, where transmitting both the first wideband CSI parameters and the first subband CSI parameters associated with the first codebook may be based on the first codebook being the base codebook.

Some examples of the method, apparatuses, and non-transitory computer-readable medium described herein may further include operations, features, means, or instructions for determining that the first codebook may be a base codebook based on the first codebook being associated with a CSI reference signal (CSI-RS) resource in a CSI-RS resource set indicated via the CSI report configuration, where transmitting both the first wideband CSI parameters and the first subband CSI parameters associated with the first codebook may be based on the first codebook being the base codebook.

In some examples of the method, apparatuses, and non-transitory computer-readable medium described herein, transmitting the respective sets of CSI parameters may include operations, features, means, or instructions for transmitting, via the CSI report, a respective set of wideband CSI parameters for each of the first codebook and the second codebook, where the respective sets of wideband CSI parameters include at least CQI parameters, PMI parameters, or both.

In some examples of the method, apparatuses, and non-transitory computer-readable medium described herein, transmitting the respective sets of CSI parameters may include operations, features, means, or instructions for transmitting, via the CSI report, a respective set of subband CSI parameters and a respective set of wideband CSI parameters for each of the first codebook and the second codebook, where the respective sets of subband CSI parameters and the respective sets of wideband CSI parameters include at least CQI parameters, PMI parameters, or both.

In some examples of the method, apparatuses, and non-transitory computer-readable medium described herein, determining the second set of codebook parameters may include operations, features, means, or instructions for determining the second set of codebook parameters based on the first set of codebook parameters associated with the first codebook and a rule for codebook parameter adaptation.

In some examples of the method, apparatuses, and non-transitory computer-readable medium described herein, the first set of codebook parameters may include a first antenna port configuration and a first PMI restriction parameter, and determining the second set of codebook parameters may include operations, features, means, or instructions for determining a second PMI restriction parameter associated with the second codebook based on the rule for codebook parameter adaptation, where the rule for codebook parameter adaptation may be based on the first PMI restriction parameter, the first antenna port configuration, and a second antenna port configuration associated with the second codebook.

In some examples of the method, apparatuses, and non-transitory computer-readable medium described herein, the first set of codebook parameters may include a first antenna port configuration and a first rank restriction parameter, and determining the second set of codebook parameters may include operations, features, means, or instructions for determining a second rank restriction parameter associated with the second codebook based on the rule for codebook parameter adaptation, where the rule for codebook parameter adaptation may be based on the first rank restriction parameter, the first antenna port configuration, and a second antenna port configuration associated with the second codebook.

In some examples of the method, apparatuses, and non-transitory computer-readable medium described herein, determining the second set of codebook parameters may include operations, features, means, or instructions for determining the second set of codebook parameters based on an indication of the second set of codebook parameters in the CSI report configuration, where the CSI report configuration includes a set of multiple sets of codebook parameters associated with a set of multiple codebooks, the set of multiple sets of codebook parameters including at least the first set of codebook parameters associated with the first codebook and the second set of codebook parameters associated with the second codebook.

In some examples of the method, apparatuses, and non-transitory computer-readable medium described herein, the first set of codebook parameters includes a first antenna port configuration, a first PMI restriction, and a first rank restriction for the first codebook and the second set of codebook parameters includes a second antenna port configuration, a second PMI restriction, and a second rank restriction for the second codebook.

Some examples of the method, apparatuses, and non-transitory computer-readable medium described herein may further include operations, features, means, or instructions for receiving one or more CSI-RSs associated with the CSI computation at the UE, computing a first set of CSI parameters for the first codebook based on the one or more CSI-RSs and in accordance with the first set of codebook parameters, and computing a second set of CSI parameters for the second codebook based on the one or more CSI-RSs and in accordance with the second set of codebook parameters, where the CSI report includes the first set of CSI parameters and the second set of CSI parameters.

A method for wireless communication at a network entity is described. The method may include transmitting, via a control message, a CSI report configuration including a first set of codebook parameters associated with at least a first codebook, the first codebook associated with a CSI measurement at a UE and receiving, via a CSI report, a respective set of CSI parameters for each of the first codebook and a second codebook based on the first set of codebook parameters, a second set of codebook parameters associated with the second codebook, and a CSI computation.

An apparatus for wireless communication at a network entity is described. The apparatus may include a processor, memory coupled with the processor, and instructions stored in the memory. The instructions may be executable by the processor to cause the apparatus to transmit, via a control message, a CSI report configuration including a first set of codebook parameters associated with at least a first codebook, the first codebook associated with a CSI measurement at a UE and receive, via a CSI report, a respective set of CSI parameters for each of the first codebook and a second codebook based on the first set of codebook parameters, a second set of codebook parameters associated with the second codebook, and a CSI computation.

Another apparatus for wireless communication at a network entity is described. The apparatus may include means for transmitting, via a control message, a CSI report configuration including a first set of codebook parameters associated with at least a first codebook, the first codebook associated with a CSI measurement at a UE and means for receiving, via a CSI report, a respective set of CSI parameters for each of the first codebook and a second codebook based on the first set of codebook parameters, a second set of codebook parameters associated with the second codebook, and a CSI computation.

A non-transitory computer-readable medium storing code for wireless communication at a network entity is described. The code may include instructions executable by a processor to transmit, via a control message, a CSI report configuration including a first set of codebook parameters associated with at least a first codebook, the first codebook associated with a CSI measurement at a UE and receive, via a CSI report, a respective set of CSI parameters for each of the first codebook and a second codebook based on the first set of codebook parameters, a second set of codebook parameters associated with the second codebook, and a CSI computation.

In some examples of the method, apparatuses, and non-transitory computer-readable medium described herein, receiving the respective sets of CSI parameters may include operations, features, means, or instructions for receiving, via the CSI report, a first set of CSI parameters including first wideband CSI parameters associated with the first codebook and first subband CSI parameters associated with the first codebook and receiving, via the CSI report, a second set of CSI parameters including second wideband CSI parameters associated with the second codebook, where the first set of CSI parameters and the second set of CSI parameters each include at least CQI parameters, PMI parameters, or both.

Some examples of the method, apparatuses, and non-transitory computer-readable medium described herein may further include operations, features, means, or instructions for transmitting a control signal that indicates the first codebook may be a base codebook, where receiving both the first wideband CSI parameters and the first subband CSI parameters associated with the first codebook may be based on the first codebook being the base codebook.

In some examples of the method, apparatuses, and non-transitory computer-readable medium described herein, receiving the respective sets of CSI parameters may include operations, features, means, or instructions for receiving, via the CSI report, a respective set of wideband CSI parameters for each of the first codebook and the second codebook, where the respective sets of wideband CSI parameters includes at least CQI parameters, PMI parameters, or both.

In some examples of the method, apparatuses, and non-transitory computer-readable medium described herein, receiving the respective sets of CSI parameters may include operations, features, means, or instructions for receiving, via the CSI report, a respective set of subband CSI parameters and a respective set of wideband CSI parameters for each of the first codebook and the second codebook, where the respective sets of subband CSI parameters and the respective sets of wideband CSI parameters include at least CQI parameters, precoding matrix indicator parameters, or both.

In some examples of the method, apparatuses, and non-transitory computer-readable medium described herein, transmitting the CSI report configuration may include operations, features, means, or instructions for transmitting, via the CSI report configuration, a set of multiple sets of codebook parameters associated with a set of multiple codebooks, where the set of multiple sets of codebook parameters include at least the first set of codebook parameters associated with the first codebook and the second set of codebook parameters associated with the second codebook.

Some examples of the method, apparatuses, and non-transitory computer-readable medium described herein may further include operations, features, means, or instructions for transmitting one or more CSI-RSs associated with the CSI computation, where receiving the CSI report may be based on the one or more CSI-RSs.

In some examples of the method, apparatuses, and non-transitory computer-readable medium described herein, the first set of codebook parameters includes a first antenna port configuration, a first PMI restriction, and a first rank restriction for the first codebook and the second set of codebook parameters includes a second antenna port configuration, a second PMI restriction, and a second rank restriction for the second codebook.

BRIEF DESCRIPTION OF THE DRAWINGS

FIGS. 15-17 show flowcharts illustrating methods that support CSI codebook parameter configuration for dynamic antenna port adaptation in accordance with one or more aspects of the present disclosure.

DETAILED DESCRIPTION

Figure 1:
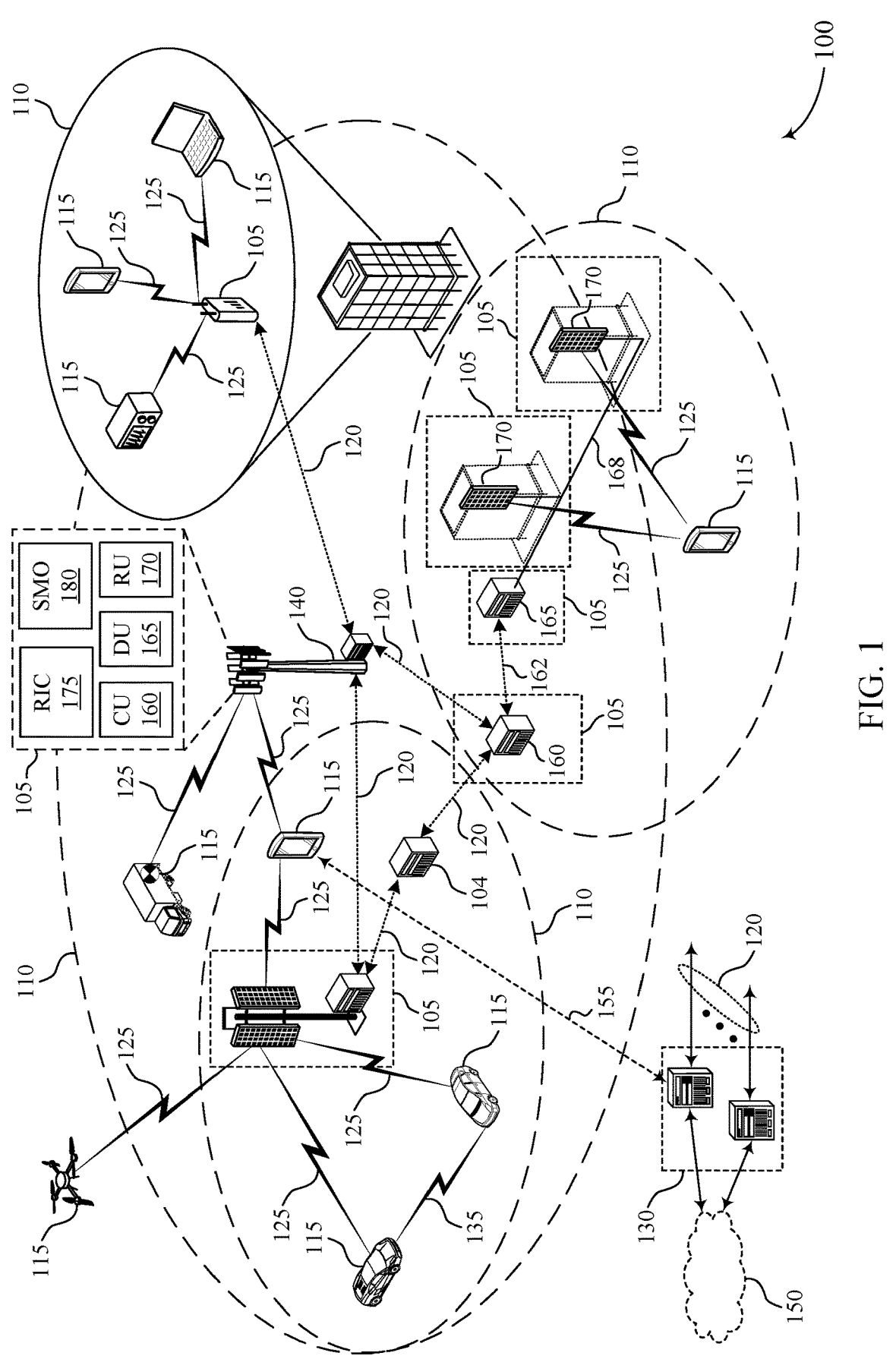
FIG. 1 illustrates an example of a wireless communications system that supports channel state information (CSI) codebook parameter configuration for dynamic antenna port adaptation in accordance with one or more aspects of the present disclosure.

In some systems, a network entity may dynamically activate or deactivate one or more antenna ports to reduce power consumption at the network entity, which may be referred to as dynamic antenna port adaptation. Different panel or antenna port usage by the network entity may correspond to different codebook configurations and may be associated with different channels used for communications between the network entity and a user equipment (UE). The network entity may transmit, to the UE, a channel state information (CSI) report configuration including one or more codebook parameters (e.g., a beam restriction, a rank restriction, an antenna port configuration, some other codebook parameters, or any combination thereof) for multiple codebooks. The UE may measure reference signals to obtain one or more CSI parameters based on the codebooks. The UE may report, via a single CSI report, the CSI measurements for the codebooks based on the received configurations to facilitate dynamic antenna port adaptation at the network entity. If the UE is configured to report CSI parameters per subband in a frequency domain, the UE may report both subband measurements and wideband measurements for each codebook, which may be associated with relatively high overhead. Additionally, or alternatively, indicating codebook parameters for each of the multiple codebooks via the CSI report configuration may be relatively complex and may be associated with relatively high overhead.

In accordance with examples as disclosed herein, a UE may derive codebook parameters, such as a beam restriction or a rank restriction, for supplemental codebooks based on codebook parameters configured for a single codebook (e.g., a base codebook or a main codebook). For example, the network entity may transmit a CSI report configuration that configures codebook parameters for at least a first codebook (e.g., the base codebook). The UE may determine codebook parameters for other codebooks (e.g., supplemental codebooks) based on the configuration of the first codebook and a rule for codebook parameter adaptation. The rule may define, for example, a relationship between first and second bits associated with the first and second codebooks, respectively, based on relative antenna port configurations of the codebooks.

In some examples, the UE may measure and report CSI parameters, such as a precoding matrix indicator (PMI) and a channel quality indicator (CQI), for a subset of the codebooks based on the codebook parameters. For example, the UE may report CSI parameters according to restrictions for reporting CSI parameters (e.g., subband and wideband CSI parameters) via the CSI report to reduce overhead. If the UE is configured to report subband CSI, the UE may report some combination of subband and wideband CSI parameters for the base codebook and the subset of supplemental codebooks based on an indication or based on configured rule for CSI reporting. For example, the rule may instruct the UE to report subband CSI for the base codebook, for each codebook (e.g., the base codebook and the supplemental codebooks), for a subset of the codebooks, or for no codebooks. In some examples, the UE may receive control signaling that indicates which codebook of the codebooks configured via the CSI report configuration is the base codebook, or the UE may be configured with a rule for selecting a base codebook from the codebooks configured via the CSI report configuration.

Aspects of the disclosure are initially described in the context of wireless communications systems. Aspects of the disclosure are additionally described in the context of a CSI configuration, codebook parameter adaption schemes, and process flows. Aspects of the disclosure are further illustrated by and described herein with reference to apparatus diagrams, system diagrams, and flowcharts that relate to CSI codebook parameter configuration for dynamic antenna port adaptation.

FIG. 1 illustrates an example of a wireless communications system 100 that supports CSI codebook parameter configuration for dynamic antenna port adaptation in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support CSI codebook parameter configuration for dynamic antenna port adaptation as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a CSI reference signal (CSI-RS)), which may be precoded or unprecoded. The UE 115 may provide feedback for beam selection, which may be a PMI or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some systems, network energy consumption to run, manage, or operate a cellular network may be associated with a relatively high cost (e.g., approximately 15-30% of a total energy expense). Further, in some systems, a relatively large percentage of the network energy consumption may come from a radio access network (RAN). For example, the RAN may account for or otherwise be responsible for approximately 40-60% of the energy expense of a system (e.g., a 5G system). Further, energy (e.g., power) consumption at the network entity 105 may be even greater in some 5G deployment scenarios. For example, if the network entity 105 supports or manages MIMO communication (e.g., 5G massive MIMO communication), the network entity 105 may consume a greater amount of power as compared to a network entity 105 in another deployment scenario (e.g., a 4G deployment scenario).

A network entity 105 may contain multiple co-located panels that may each include multiple power amplifiers, antenna ports, and antenna subsystems. These components may consume a relatively large amount of power at the network entity 105. To conserve power, the network entity 105 may dynamically activate and deactivate panels, sub-panels, or antenna ports (e.g., dynamic antenna port adaptation). For example, the network entity 105 may disable the panels, sub-panels, or antenna ports when a cell load is low. However, different panel or port usage at the network entity 105 may correspond to different codebook configurations and may be associated with different channels used for communications between the network entity 105 and a UE 115. Accordingly, the network entity 105 may transmit a CSI report configuration to the UE 115, which may include one or more codebook configurations and report settings.

The network entity 105 may configure the UE 115 (e.g., by transmitting control signaling) with the CSI report configuration (which may be equivalently referred to as a CSI report config or a CSI reporting setting) for the UE 115 to report CSI. The CSI report configuration may link to one or more resource settings associated with different measurement types. For example, the CSI report configuration may link to one or more of a non-zero power (NZP) CSI-RS resource for channel measurement (CMR), a CSI-RS resource for interference measurement (CSI-IM), or an NZP CSI-RS for interference measurement (NZP-IMR), or any combination thereof. Each resource setting of the one or more resource settings to which the CSI report configuration may link may be associated with multiple resources sets, but one active resource set (e.g., only one active resource set).

Each resource set may include one or more resources. For example, the NZP-CMR resource set n may include N resources including an NZP-CMR resource a1 and an NZP-CMR resource a2. Similarly, the CSI-IM resource set m may include M resources including a CSI-IM resource b1 and a CSI-IM resource b2. Similarly, the NZP-IMR resource set s may include S resources including an NZP-IMR resource b1 and an NZP-IMR resource b2. On CSI-IM resources, other signals designated to the UE 115 may be muted so that the UE 115 may measure interference directly. Further, NZP CSI-RS may be used primarily for channel measurement, but also may be used for interference measurement (and, as such, may be referred to as an NZP CSI-RS for interference measurement), where a channel estimated using the CSI-RS may be included in the assumed or measured interference.

In some examples, the UE 115 may be configured to report wideband CQI and subband CQI. The network entity 105 may indicate to the UE 115 the CQI format (e.g., in a cqi-FormatIndicator field). In some examples, if the UE 115 is configured with wideband CQI (e.g., the UE is indicated wideband CQI in the cqi-FormatIndicator field), the UE 115 may report wideband CQI information (e.g., 4-bits of CQI information, or some other quantity of bits). In other examples, if the UE 115 is configured with subband CQI (e.g., the UE is indicated subbandCQI in the cqi-FormatIndicator field), the UE 115 may report wideband CQI information and differential CQI information for each subband corresponding to the subband CQI (e.g., 2-bit differential CQI information, or some other quantity of bits). In some aspects, the quantity of bits of subband CQI may be indicated to the UE 115 via a parameter in the CSI report configuration (e.g., via a higher layer parameter such as cqi-BitsPerSubband). If the parameter corresponding to the quantity of bits per subband differential CQI is null or not configured via the CSI report configuration, a subband differential CQI offset level for each subband with index s may be determined in accordance with Equation 1, shown below.

$$\text{Subband offset level}(s) = \text{subband CQI index}(s) - \text{wideband CQI index} \tag{1}$$

The subband differential CQI values may be mapped to one or more offset levels as shown in Table 1.

TABLE 1

| Mapping of subband differential CQI values to CQI offset level | |
| --- | --- |
| Subband Differential CQI Value | Offset Level |
| 0 | 0 |
| 1 | 1 |
| 2 | $\geq 2$ |
| 3 | $\leq -1$ |

If the UE 115 is configured to report subband CSI parameters, the UE 115 may report both wideband and subband CSI parameters, such as CQI, corresponding to each of one or more configured codebooks to the network entity 105. However, reporting both wideband and subband CSI parameters for each of the codebooks without restrictions for CSI reporting may incur a relatively large amount of overhead and complexity at the UE 115.

Accordingly, techniques described herein provide for a UE 115 to report CSI parameters based on one or more configured restrictions for CSI reporting. In some examples, the UE 115 may report both subband and wideband parameters (e.g., CQI or PMI) computed in accordance with the one or more codebooks. In other examples, the UE 115 may report both subband and wideband parameters computed in accordance with a base codebook (e.g., a main codebook) and wideband CSI parameters computed in accordance with one or more of supplemental codebooks. In further examples, the UE 115 may report only wideband CSI parameters associated with one or more codebooks, and the UE 115 may refrain from reporting subband CSI parameters (e.g., if the UE 115 is not configured with subband CSI parameters for any of the codebooks). In some cases, the UE 115 may sort computed CSI parameters according to one or more parameters (e.g., spectral efficiency) and select CSI to be reported based on the sorting of the computed CSI parameters. The UE 115 may thereby reduce overhead and power consumption by reporting fewer CSI parameters than if the UE 115 is not configured with CSI reporting restrictions.

In some aspects, techniques described herein provide for the UE 115 to derive codebook parameters for one or more additional codebooks based on codebook parameters configured via a CSI report configuration for a first codebook (e.g., a base codebook). The UE 115 may determine additional sets of codebook parameters associated with the one or more additional codebooks (e.g., supplemental codebooks) based on the codebook parameters associated with the first codebook and a rule for codebook parameter adaptation. The UE 115 may transmit a CSI report including a set of CSI parameters for each of the first codebook and the one or more of the additional codebooks based on the first set of codebook parameters, the additional sets of codebook parameters, and a CSI computation at the UE 115. The techniques for CSI parameter restrictions and codebook parameter derivation described herein may improve communication reliability and reduce overhead and power consumption by the UE 115 and a network entity 105 in communication with the UE 115.

Figure 2:
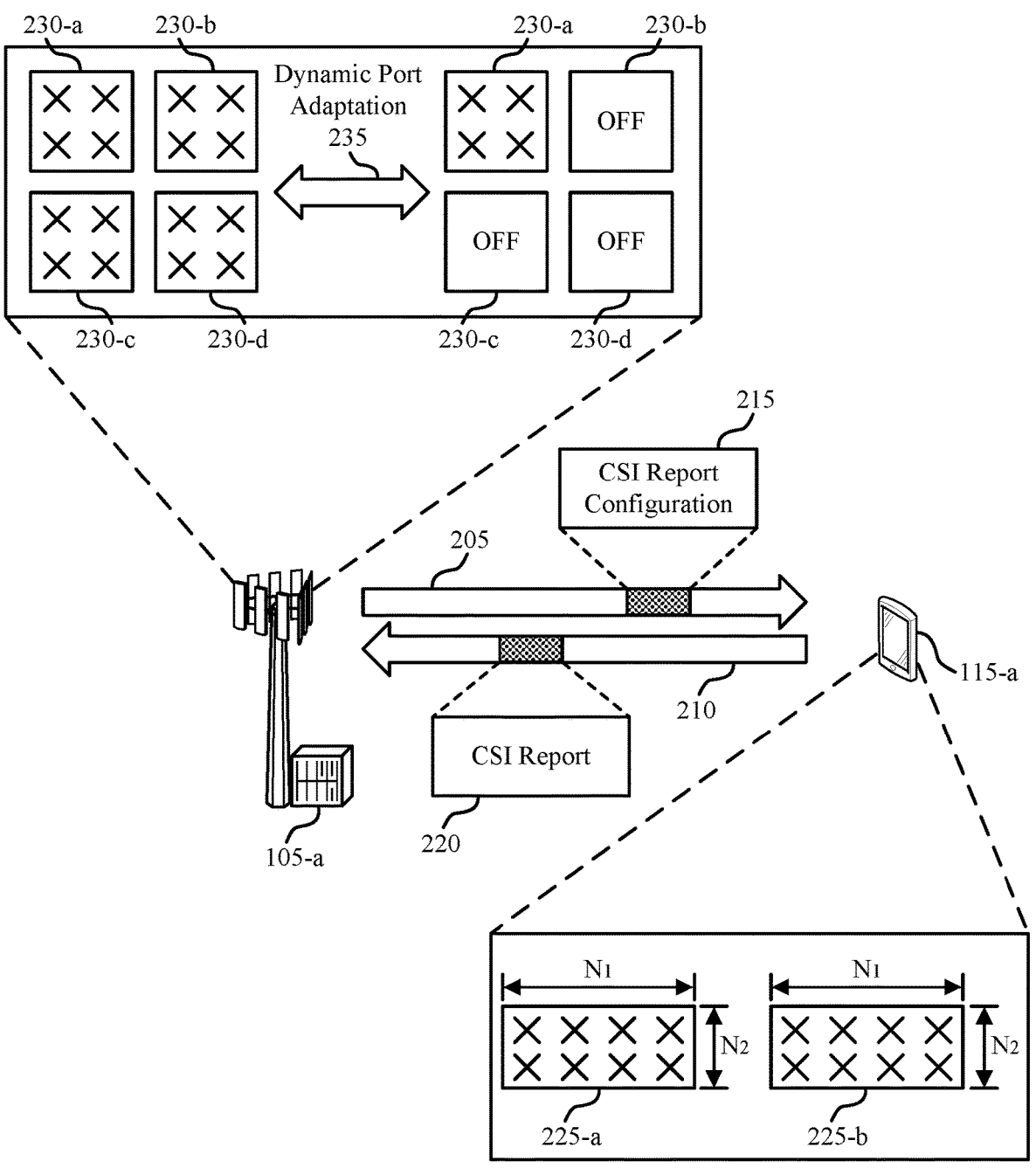
FIG. 2 illustrates an example of a wireless communications system that supports CSI codebook parameter configuration for dynamic antenna port adaptation in accordance with one or more aspects of the present disclosure.

FIG. 2 illustrates an example of a wireless communications system 200 that supports CSI codebook parameter configuration for dynamic antenna port adaptation in accordance with one or more aspects of the present disclosure. The wireless communications system 200 may implement or be implanted by one or more aspects of the wireless communications system 100, as described herein with reference to FIG. 1. For example, the wireless communications system 200 may include a network entity 105-a and a UE 115-a, which may be examples of corresponding devices described herein including with reference to FIG. 1. The network entity 105-a and UE 115-a may communicate via a downlink communication link 205 and uplink communication link 210.

The UE 115-a and the network entity 105-a may support communications via a downlink communication link 205 or an uplink communication link 210, or both. To support the communications (e.g., MIMO communications), the UE 115-a may support or operate a panel 225-a (e.g., an antenna panel) and a panel 225-b, and the network entity 105-a may support a panel 230-a, a panel 230-b, a panel 230-c, and a panel 230-d. In some aspects, one or more of the panels 230 may be co-located and each may be associated with multiple antenna ports. Additionally, each panel may be equipped with one or more transceiver chains with a relatively large quantity of power amplifiers (PAs) and one or more antenna subsystems, which may consume a relatively large amount of power. As such, each antenna panel may be equipped with one or more transceiver chains and each of the one or more transceiver chains may include or may otherwise be associated with one or more PAs and one or more antenna subsystems, which may consume a relatively large amount of power.

To support energy saving features, the network entity 105-a may engage in dynamic port adaptation 235, which may include dynamically activating and deactivating panels 230 or components thereof (e.g., sub-panels, antenna ports, and PAs) if, for example, a cell load of the network entity 105-a is relatively low (e.g., below a threshold cell load). As an example, and as illustrated in FIG. 2, if the network entity 105-a is scheduled for or otherwise expects a relatively small amount of data traffic, the network entity 105-a may disable (e.g., turn off and no longer provide power to) panels 230-b, 230-c, and 230-d. Different usage or configuration of panels 230 at the network entity 105-a may correspond to different codebook configurations and may be associated with different channels used for communications between the network entity 105-a and the UE 115-a.

In some implementations, the network entity 105-a may select which one or more panels 230 (e.g., and, sub-panels, transceiver chains, or antenna ports) to turn off in accordance with CSI received from the UE 115-a to avoid losing a connection with the UE 115-a or otherwise reducing a quality of channel conditions between the network entity 105-a and the UE 115-a. As such, the network entity 105-a may configure or request the UE 115-a to provide CSI associated with one or more antenna configurations at the network entity 105-a. The network entity 105-a may store the CSI and identify which antenna configurations of the network entity 105-a provide a sufficient link quality between the network entity 105-a and the UE 115-a.

To configure or request the UE 115-a to provide CSI to the network entity 105-a, the network entity 105-a may transmit a CSI report configuration 215 to the UE 115-a. In some examples, the network entity 105-a may transmit the CSI report configuration 215 via RRC signaling, a medium access control-control element (MAC-CE), or some other control signaling. In some aspects, the CSI report configuration 215 may be configured per BWP. The CSI report configuration 215 may indicate a set of parameters and resources that the UE 115-a may use to select, obtain, compute, measure, or otherwise determine a set of CSI parameters.

In some implementations, the CSI report configuration 215 may indicate a codebook configuration, which may correspond to or may indicate a codebook type. For example, the codebook configuration may correspond to different types of PMI codebook reporting. The different types may include Type 1 single panel, Type 1 multiple panels, Type 2 single panel, Type 2 port selection, and Type 2 enhanced port selection (e.g., typeI-SinglePanel, typeI-MultiPanel, and typeII, among other examples). The codebook configuration may additionally, or alternatively, indicate a discrete Fourier transform (DFT) beam restriction (e.g., an $(O_1, O_2)$ configuration), and a rank index (RI) restriction. The CSI report configuration 215 may indicate a report configuration type for CSI reporting, such as periodic, semi-persistent, or aperiodic. In some aspects, the CSI report configuration 215 may be RRC configured per BWP and a given resource set may have $K_s$ resources with a same quantity of CSI-RS ports. For example, if $K_s=1$, each resource may include at most 32 CSI-RS ports; if $K_s=2$, each resource may include at most 16 CSI-RS ports; or if $2<K_s<8$, each resource may include at most 8 CSI-RS ports. In some aspects, a P-port resource may include ports labeled from 3000 to 300(P−1).

The CSI report configuration 215 may indicate a set of parameters associated with an antenna configuration at one or both of the network entity 105-a or the UE 115-a. For example, the UE 115-a and the network entity 105-a may support settings of an antenna element configuration and a quantity of panels (e.g., active panels) for each codebook type and may support a corresponding quantity of CSI-RS antenna ports (e.g., per resource). In some aspects, an antenna element configuration may be denoted as $(N_1, N_2)$, where $N_1$ may refer to a quantity of antenna elements in a first direction on a panel (e.g., a horizontal direction) and $N_2$ may refer to a quantity of antenna elements in a second direction on the panel (e.g., a vertical direction). Further, a quantity of panels may be denoted as $N_g$ and, as such, a quantity of CSI-RS antenna ports corresponding to an $(N_g, N_1, N_2)$ antenna configuration may be equal to $2N_gN_1N_2$ because each antenna element may be associated with two different polarizations. In the example of the wireless communications system 200, the UE 115-a may support an antenna configuration of $(N_g=2, N_1=4, N_2=2)$.

Table 2 and Table 3, shown below, include examples of other supported configurations of $(N_1, N_2)$ and $(N_g, N_1, N_2)$, respectively. Tables 2 and 3 further include corresponding configurations of $(O_1, O_2)$, where $O_1$ may be associated with a beam sweeping step in a horizontal direction and $O_2$ may be associated with a beam sweeping step in a vertical direction. Additionally, or alternatively, $(O_1, O_2)$ may be associated with a DFT beam restriction (e.g., a limitation, constraint, or configuration) associated with the CSI report configuration 215.

TABLE 2

| Supported Configurations of ($N_1$, $N_2$) and ($O_1$, $O_2$) | | |
|---|---|---|
| Quantity of CSI-RS Antenna Ports, $P_{CSI-RS}$ | ($N_1$, $N_2$) | ($O_1$, $O_2$) |
| 4 | (2, 1) | (4, 1) |
| 8 | (2, 2) | (4, 4) |
|  | (4, 1) | (4, 1) |
| 12 | (3, 2) | (4, 4) |
|  | (6, 1) | (4, 1) |
| 16 | (4, 2) | (4, 4) |
|  | (8, 1) | (4, 1) |
| 24 | (4, 3) | (4, 4) |
|  | (6, 2) | (4, 4) |
|  | (12, 1) | (4, 1) |
| 32 | (4, 4) | (4, 4) |
|  | (8, 2) | (4, 4) |
|  | (16, 1) | (4, 1) |

TABLE 3

| Supported Configurations of ($N_g$, $N_1$, $N_2$) and ($O_1$, $O_2$) | | |
|---|---|---|
| Quantity of CSI-RS Antenna Ports, $P_{CSI-RS}$ | ($N_g$, $N_1$, $N_2$) | ($O_1$, $O_2$) |
| 8 | (2, 2, 1) | (4, 1) |
| 16 | (2, 4, 1) | (4, 1) |
|  | (4, 2, 1) | (4, 1) |
|  | (2, 2, 2) | (4, 4) |
| 32 | (2, 8, 1) | (4, 1) |
|  | (4, 4, 1) | (4, 1) |
|  | (2, 4, 2) | (4, 4) |
|  | (4, 2, 2) | (4, 4) |

In accordance with receiving the CSI report configuration 215, the UE 115-a may measure or estimate a channel using one or more CSI-RS resources and the set of codebook parameters indicated by the CSI report configuration 215. As such, the UE 115-a may select, compute, calculate, or otherwise obtain a set of CSI parameters and may transmit an indication of the set of CSI parameters to the network entity 105-a via a CSI report 220. The CSI report 220 may be associated with a format that depends on which type (e.g., Type 1 or Type 2) of codebook reporting the UE 115-a is configured to provide.

For Type 1, which may be associated with single-slot reporting, the UE 115-a may generate the CSI report 220 such that the CSI report 220 includes up to two parts. In a first part of the CSI report 220, the UE 115-a may include an RI, a CSI-RS resourced indicator (CRI), and a CQI for a first codeword. In a second part of the CSI report 220, the UE 115-a may include a PMI and a CQI for a second codeword (e.g., in examples in which the RI is greater than a threshold value, such as when RI>4). The UE 115-a may provide a Type 1 CSI report for periodic, semi-persistent, and aperiodic CSI and may transmit the CSI report 220 via a physical uplink control channel (PUCCH) or a physical uplink shared channel (PUSCH), such as a short or long PUCCH or PUSCH. For Type 1 subband CSI, the UE 115-a may transmit the CSI report 220 using a PUSCH or a long PUCCH.

For Type 2, the UE 115-a may similarly generate the CSI report 220 such that the CSI report 220 may include up to two parts. In a first part of the CSI report 220, the UE 115-a may include an RI, a CQI, and an indication of a quantity of non-zero wideband amplitude coefficients per layer. In some aspects, the first part of the CSI report 220 may have a fixed payload size, each field may be encoded separately, and the first part of the CSI report 220 may indicate or otherwise identify a quantity of information bits included in a second part of the CSI report. 220 In the second part of the CSI report 220, the UE 115-a may include a PMI corresponding to the non-zero wideband amplitude coefficients per layer indicated in the first part of the CSI report 220. The UE 115-a may provide a Type 2 CSI report for semi-persistent or aperiodic CSI and may transmit the CSI report using a long PUCCH (e.g., for the first part of the CSI report 220) or a PUSCH (for either or both of the first part or the second part of the CSI report 220). In some aspects, the UE 115-a may not multiplex CSI parameters of the CSI report across PUCCH or PUSCH transmissions and CSI reports using a long PUCCH and using a PUSCH may be calculated independently. Further, whether the UE 115-a can be configured with Type 2 CSI reports using both a long PUCCH and a PUSCH may be associated with (e.g., depend on) a UE capability, which the UE 115-a may indicate to the network entity 105-a. Layer 1-reference signal receive power (RSRP) and resource indicators for beam management may be mapped to a first part of a CSI report 220 if CSI is reported using a long PUCCH or PUSCH.

In some examples, the UE 115-a may perform a CSI calculation to obtain one or more CSI parameters (e.g., an RI parameter, a PMI parameter, and a CQI parameter) for each of one or more of the codebooks (e.g., the base codebooks and supplemental codebooks) for which the UE 115-a may report CSI. In some implementations, the UE 115-b may obtain a downlink channel estimation $(H)_{M_r M_t}$, where $M_r \times M_t$ may define a downlink channel matrix H. The UE 115-a may calculate a precoding and rank selection for a given codebook in accordance with Equation 2, shown below, and in light of a codebook from rank-1 to rank-R being given by $\{\{P_1(0), \ldots, P_1(L_1-1)\}, \ldots, \{P_R(0), \ldots, P_R(L_R-1)\}\}$.

$$(R^*, i^*) = \text{argmax}_{r,i} SE_{est}(H, P_r(i)) \qquad (2)$$

In the example of Equation 2, $SE_{est}(H, P_r(i))$ may denote a spectral efficiency estimation where H and $P_r(i)$ may be given or known. $R^*$ may denote a rank (e.g., an optimal or sufficient rank), and $P_{R^*}(i^*)$ may denote a precoder (e.g., an optimal or sufficient precoder). The UE 115-a may further perform a CQI calculation in accordance with Equation 3, shown below.

$$CQI^* = f(SE_{est}(H, P_r(i))) \qquad (3)$$

In the example of Equation 3, a CQI parameter may be conditioned on the rank and precoder.

In some examples, the CSI report configuration 215 may include a resource setting (e.g., a CSI-RS resource) and a codebook configuration (e.g., for one or more codebooks). In some examples, the CSI report configuration 215 may indicate a main codebook (e.g., a base codebook). Alternatively, the UE 115-a may select a codebook from among the codebooks indicated in the CSI report configuration 215 to be the main codebook. For example, the UE 115-a may use a configured (e.g., pre-configured at manufacture or indicated to the UE 115-a) set of rules to determine the main codebook. In some examples, the rules may involve selecting a codebook with a largest or smallest amount of antenna ports. If a quantity of antenna ports are the same for one or more codebooks, the UE 115-a may select a codebook with a largest or smallest quantity of antenna elements in a direction (e.g., a smallest or largest value of $N_1$ or $N_2$, where $N_1$ may refer to a horizontal quantity of antenna elements on a panel 225 and $N_2$ may correspond to a vertical quantity of antenna elements on a panel 225). Additionally, or alternatively, the UE 115-a may select a codebook that is associated with a resource in a CSI-RS resource set, which may be indicated in the resource setting of the report configuration 215.

Techniques described herein provide for the UE 115-*a* to determine parameters for one or more additional (e.g., supplemental or derived) codebooks from a configuration of the main or base codebook received via the CSI report configuration 215. For example, the UE 115-*a* may derive codebook parameters (e.g., beam and RI restrictions) based on codebook parameters for the main codebook. In some examples, the one or more additional codebooks may be associated with different antenna port configurations (e.g., different values for ($N_1$, $N_2$)) than the main codebook. The UE 115-*a* may determine the additional codebook parameters in accordance with a rule for codebook parameter adaption, which may, for example, define a relationship between first and second bits associated with the main codebook and the additional codebook, respectively, based on relative antenna port configurations of the main codebook and the additional codebook. Accordingly, the UE 115-*a* may determine supplemental codebook parameters for supplemental codebooks without explicit signaling of codebook parameters for the supplemental codebooks, which may reduce power consumption and overhead at the UE 115-*a* and the network entity 105-*a*. Techniques for deriving codebook parameters for supplemental codebooks are illustrated and described in further detail elsewhere herein, including with reference to FIGS. 3-5.

The UE 115-*a* may compute CSI parameters according to one or more of the codebooks configured via the CSI report configuration 215 (e.g., a main codebook and one or more additional or supplemental codebooks). For example, the UE 115-*a* may compute wideband CSI parameters and subband CSI parameters according to one or more of the configured codebooks, and the UE 115-*a* may sort the computed CSI parameters according to one or more metrics (e.g., according to spectral efficiency, or some other metric). The UE 115-*a* may report one or more of the computed CSI parameters in a CSI report 220, for example, based on the sorting.

The UE 115-*a* may report CSI parameters associated with all or a subset of the one or more configured codebooks (e.g., the codebook indicated via the CSI report configuration 215 or the codebooks derived by the UE 115-*a*). For example, if the CSI report configuration 215 configures N codebooks, the UE 115-*a* may report CSI corresponding to X codebook configurations, where X may be less than or equal to N (e.g., $1 < X \leq N$). The codebooks to use for CSI reporting may be determined by the UE 115-*a* or may be configured by the network entity 105-*a*. In some cases, as described herein with reference to FIG. 1, some UEs 115 may report both wideband and subband CSI parameters for each of the X codebooks, which may incur a relatively large amount of overhead and complexity at the UE 115-*a*, and may result in increased signaling between the UE 115-*a* and the network entity 105-*a*.

Techniques, systems, and devices described herein provide for reduced overhead for CSI reporting by implementing one or more rules for CSI reporting (e.g., CSI reporting restrictions). In some implementations, the UE 115-*a* may be configured with a restriction for reporting (e.g., in the CSI report 220) subband CSI parameters, wideband CSI parameters, or both if the UE 115-*a* is configured to report subband CSI. In some examples, the UE 115-*a* may be configured to report both subband and wideband CSI parameters associated with each of the codebooks. In other examples, the UE 115 may report both subband and wideband parameters that are associated with (e.g., computed in accordance with) a base codebook, and the UE 115-*a* may be configured to report wideband CSI parameters that are associated with (e.g., computed in accordance with) one or more of supplemental codebooks. The UE 115-*a* may determine which codebook is the base codebook based on an indication, one or more parameters (e.g., an antenna port configuration), one or more rules, or any combination thereof, as described herein. In some other examples, the UE 115 may be configured to report wideband CSI parameters associated with each codebook indicated via the CSI report 220, and the UE 115-*a* may refrain from reporting subband CSI parameters for the codebooks (e.g., the UE 115 may not be configured with subband CSI parameters for any of the codebooks). In some examples, the restrictions for reporting CSI parameters may include restrictions for reporting CQI, PMI, or both. For example, the CSI parameters may include CQI parameters, PMI parameters, other CSI parameters, or any combination thereof.

In some examples, a codebook may be made of or may include a set of a precoder matrices, W. Each precoder matrix may be defined by a DFT vector (e.g., $v_{l,m}$), one or more codebook indices i (e.g., $i_{1,1}$, $i_{1,2}$, $i_{1,3}$, and $i_2$), and one or more co-phasing factors (e.g., $\varphi_n$ and $\theta_p$). The UE 115-*a* may compute each precoder matrix W corresponding to a codebook according to the one or more codebook indices, the co-phasing factors, a quantity of CSI-RS ports (e.g., antenna ports) at the UE 115-*a*, a quantity of layers (e.g., 1-layer, 2-layer, 3-layer, etc.) configured for CSI reporting, the values of $N_1$ and $N_2$, values associated with a DFT beam restriction (e.g., $O_1$ and $O_2$), a DFT vector (e.g., $\vartheta_{l,m}$), an indicated value for a codebook mode (e.g., codebookMode), or any combination thereof.

Tables 4-6 include examples of codebook configurations for 1-layer, 2-layer, and 3-layer CSI reporting. The codebooks may each be a set of a precoder matrices $W^{(Layer)}$, in accordance with Tables 4-6 below.

TABLE 4

| Codebook for 1-layer CSI reporting using antenna ports 3000 to 2999 + $P_{CSI\ RS}$ codebookMode = 1 | | |
|---|---|---|
| $i_{1,1}$ | $i_{1,2}$ | $i_2$ |
| $0, 1, \ldots, N_1O_1 - 1$ | $0, 1, \ldots, N_2O_2 - 1$ | $0, 1, 2, 3$ | $W^{(1)}_{i_{1,1},i_{1,2},i_2}$ |

$$\text{where } W^{(1)}_{l,m,n} = \frac{1}{\sqrt{P_{CSI\ RS}}} \begin{bmatrix} v_{l,m} \\ \varphi_n v_{l,m} \end{bmatrix}.$$

TABLE 5

| Codebook for 2-layer CSI reporting using antenna ports 3000 to 2999 + $P_{CSI\ RS}$ codebookMode = 1 | | |
|---|---|---|
| $i_{1,1}$ | $i_{1,2}$ | $i_2$ |
| $0, 1, \ldots, N_1O_1 - 1$ | $0, \ldots, N_2O_2 - 1$ | $0, 1$ | $W^{(2)}_{i_{1,1},i_{1,1}+k_i,i_{1,2}+k_2,i_2}$ |

$$\text{where } W^{(2)}_{l,l',m,m',n} = \frac{1}{\sqrt{2P_{CSI\ RS}}} \begin{bmatrix} v_{l,m} & v_{l',m'} \\ \varphi_n v_{l,m} & -\varphi_n v_{l',m'} \end{bmatrix}.$$

TABLE 6

Codebook for 3-layer CSI reporting using antenna ports
3000 to 2999 + $P_{CSI\_RS}$ codebookMode = 1-2, $P_{CSI\_RS} \geq 16$

| $i_{1,1}$ | $i_{1,2}$ | $i_{1,3}$ | $i_2$ | |
|---|---|---|---|---|
| $0, \ldots, \dfrac{N_1 O_1}{2} - 1$ | $0, \ldots, N_2 O_2 - 1$ | 0, 1, 2, 3 | 0, 1 | $W^{(3)}_{i_{1,1}, i_{1,2}, i_{1,3}, i_2}$ | where $W^{(3)}_{l,m,p,n} = \dfrac{1}{\sqrt{3 P_{CSI\_RS}}} \begin{bmatrix} \tilde{v}_{l,m} & \tilde{v}_{l,m} & \tilde{v}_{l,m} \\ \theta_p \tilde{v}_{l,m} & -\theta_p \tilde{v}_{l,m} & \theta_p \tilde{v}_{l,m} \\ \varphi_n \tilde{v}_{l,m} & \varphi_n \tilde{v}_{l,m} & -\varphi_n \tilde{v}_{l,m} \\ \varphi_n \theta_p \tilde{v}_{l,m} & -\varphi_n \theta_p \tilde{v}_{l,m} & -\varphi_n \theta_p \tilde{v}_{l,m} \end{bmatrix}$.

The codebooks may thereby be determined based on co-phasing factors, codebook indices, and DFT vectors. Values of the co-phasing factors, $\varphi_n$ and $\theta_p$, may be defined by Equations 4 and 5, respectively. Additionally, the DFT vectors $u_m$, $v_{l,m}$, and $\tilde{v}_{l,m}$ which may be used in Tables 4-6, are defined by Equations 6-8 below.

$$\phi_n = e^{j\pi n/2} \tag{4}$$

$$\theta_p = e^{j\pi p/4} \tag{5}$$

$$u_m = \begin{cases} \begin{bmatrix} 1 & e^{\frac{j\pi m}{O_2 N_2}} \ldots e^{\frac{j\pi m(N_2-1)}{O_2 N_2}} \end{bmatrix}, & N_2 > 1 \\ 1, & N_2 = 1 \end{cases} \tag{6}$$

$$v_{l,m} = \begin{bmatrix} u_m e^{\frac{j2\pi l}{O_1 N_1}} u_m \ldots e^{\frac{j2\pi l(N_1-1)}{O_1 N_1}} u_m \end{bmatrix}^T \tag{7}$$

$$\tilde{v}_{l,m} = \begin{bmatrix} u_m e^{\frac{j4\pi l}{O_1 N_1}} u_m \ldots e^{\frac{j2\pi l(N_1-1)}{O_1 N_1}} u_m \end{bmatrix}^T \tag{8}$$

In the example of Equations 4-8, l and m may represent indices to entries in the codebook, which may be determined based on the codebook indices i (e.g., $i_{1,1}$, $i_{1,2}$, and $i_{1,3}$). In some aspects, the UE 115-a may report the codebook indices, the co-phasing factors, or both via the CSI report 220. The codebooks described herein may thereby include a set of entries each indexed according to indices l and m.

In some examples, restrictions for reporting PMI may be or include a restriction on the entries indicated by the codebook indices i (e.g., $i_{1,1}$, $i_{1,2}$, and $i_{1,3}$), which may limit values of l and m. The restrictions may be indicated via a set of bits corresponding to the DFT vector. For example, if the corresponding bits (e.g., indicated to or computed by the UE 115-a) for a DFT vector (e.g., $\vartheta_{l,m}$ or $\tilde{\vartheta}_{l,m}$) are set as to restrict (e.g., not allow) PMI reporting by the UE 115-a, the UE 115-a may refrain from performing CSI computation for the corresponding PMI, which may decrease power consumption and processing at the UE 115-a. The UE 115-a may thereby refrain from reporting the codebook indices and co-phasing factor for the entries indicated by the bits. In some aspects, the network entity 105-a may similarly indicate restrictions for reporting RI parameters.

The network entity 105-a may thereby indicate one or more CSI parameter restrictions (e.g., PMI and RI restrictions) for the UE 115-a to use for CSI reporting with reduced overhead and complexity. In some aspects, the UE 115-a may determine whether to report subband CSI, wideband CSI, or both for one or more codebooks based on a configured rule, which may reduce overhead and complexity. Additionally, or alternatively, the UE 115-a may derive codebook parameters, such as a PMI restriction, an RI restriction, or both for one or more supplemental codebooks based on codebook parameters configured for a base codebook. Such codebook parameter derivations are described in further detail elsewhere herein, including with reference to FIGS. 3-5.

Figure 3:
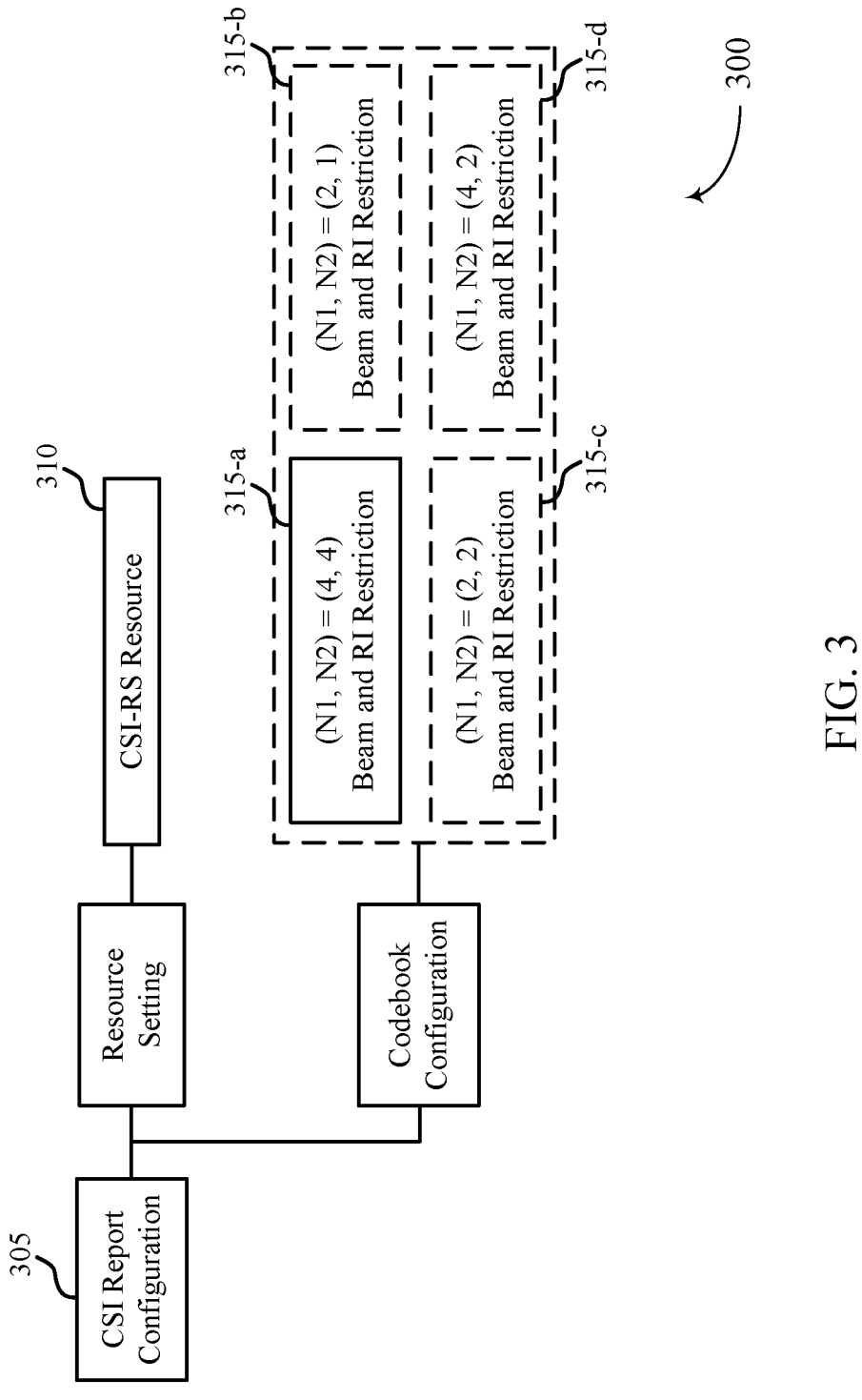
FIG. 3 illustrates an example of a CSI configuration that supports CSI codebook parameter configuration for dynamic antenna port adaptation in accordance with one or more aspects of the present disclosure.

FIG. 3 illustrates an example of a CSI configuration 300 that supports CSI codebook parameter configuration for dynamic antenna port adaptation in accordance with one or more aspects of the present disclosure. The CSI configuration 300 may implement or be implemented by aspects of the wireless communications systems 100 and 200 as described herein with reference to FIGS. 1 and 2. For example, the CSI configuration 300 illustrates a CSI report configuration 305, which may represent an example of a CSI report configuration 215, as described herein with reference to FIG. 2. The CSI report configuration 305 may be transmitted by a network entity 105 to a UE 115, which may represent examples of corresponding devices as described herein with reference to FIGS. 1 and 2.

The CSI report configuration 305 may be or may contain a resource setting and a codebook configuration, which may be used by the UE 115 for CSI reporting procedures. For example, the UE 115 may send a CSI report to a network entity 105. The CSI report may include one or more CSI parameters, which may be associated with or derived based on one or more codebooks 315. The resource setting of the CSI report configuration 305 may be or include a CSI-RS resource 310. In some examples, the CSI-RS resource 310 may be a base resource for use by the UE 115 in, for example, CSI reporting procedures. In some cases, the CSI-RS resource 310 be a 32-port CSI-RS resource.

The codebook configuration of the CSI report configuration 305 may configure one or more codebooks 315. Each codebook 315 may be associated with an antenna port configuration (e.g., $(N_1, N_2)$, as described herein with reference to FIG. 2), a beam restriction, an RI restriction, or any combination thereof. That is, the CSI report configuration 305 may include codebook parameters and restrictions for multiple codebooks 315. Configuring codebook parameters for multiple codebooks 315 via a single CSI report configuration 305 may be associated with relatively high overhead and complexity.

To reduce overhead, the CSI report configuration 305 described herein may indicate or configure codebook parameters for a single codebook 315-a, which may be referred to as a base codebook or a main codebook. Each of the base codebook 315-a and one or more other codebooks 315 indicated via the CSI report configuration 305, which may be referred to as supplemental codebooks, may be associated with a respective antenna port configuration. In the example of FIG. 3, the base codebook 315 may be associated with an antenna port configuration of $(N_1, N_2)=(4,4)$. The base codebook 315-a may be configured with one or more beam (e.g., PMI) and RI restrictions. In some examples, the derived codebooks 315-b, 315-c, and 315-d may be associated with different antenna port configurations (e.g., different values of $(N_1, N_2)$) than the base codebook 315-a.

In some examples, the CSI-RS resource 310 (e.g., a base CSI-RS resource) may be shared among each of the codebooks 315. For example, the UE 115 may report CSI in accordance with the CSI-RS resource 310 and any one or more codebooks 315 of the configured codebooks 315-a, 315-b, 315-c, and 315-d. Alternatively, the UE 115 may be configured with additional resource settings for use with the configured codebooks. For example, the UE 115 may be configured (e.g., indicated in the CSI report configuration

305 or in another configuration) with additional CSI-RS resources 310 for use with codebooks 315-b, 315-c, and 315-d.

Techniques, systems, and devices described herein provide for a UE 115 to derive codebook parameters, such as beam and RI restrictions, based on codebook parameters configured for the base codebook 315-a in the CSI report configuration 305. The UE 115 may determine the additional codebook parameters in accordance with a rule for codebook parameter adaptation. For example, to determine codebook parameters for a second codebook 315-b, the rule may define a relationship between first and second bits associated with the base codebook 315-a and the second codebook 315-b, respectively, based on relative antenna port configurations of the codebooks 315-a and 315-b. The rule may be based on an antenna configuration for the base codebook 315-a and an antenna configuration for the supplemental codebook 315-b for which the codebook parameters may be derived. For example, $N_1$, $N_2$, $O_1$, and $O_2$ may represent antenna and beam sweeping parameters for the base codebook 315-a, and $N_1'$, $N_2'$, $O_1'$, and $O_2'$ may represent antenna and beam sweeping parameters for the supplemental codebook 315-b. The UE 115 may determine PMI restrictions for codebooks 315-b, 315-c, and 315-d based on the PMI restrictions indicated for codebook 315-a and the predetermined rule.

The UE 115 may report CSI in accordance with one or more of the codebooks 315. For example, the UE 115 may compute CSI for each codebook 315-a, 315-b, 315-c, and 315-d. The UE 115 may report one or more of the computed CSI parameters (e.g., in a same CSI report). Additionally, or alternatively, the UE 115 may report CSI parameters corresponding to the base codebook 315-a and, in some cases, one or more supplemental CSI parameters corresponding to other codebooks (e.g., derived codebooks 315-b, 315-c, and 315-d).

A UE 115 as described herein may thereby derive codebook parameters for one or more supplemental codebooks 315 based on a configuration of a base codebook 315. The network entity 105 may refrain from transmitting an indication of the codebook parameters for the supplemental codebooks 315 based on the capability or configuration of the UE 115 to derive the parameters. As such, by deriving codebook parameters, such as PMI restrictions, RI restrictions, or both, the UE 115 may reduce overhead and complexity. Techniques for deriving codebook parameters are described in further detail elsewhere herein, including with reference to FIGS. 4 and 5.

Figure 4:
FIG. 4 illustrates an example of a codebook parameter adaption scheme that supports CSI codebook parameter configuration for dynamic antenna port adaptation in accordance with one or more aspects of the present disclosure.
Figure 4:
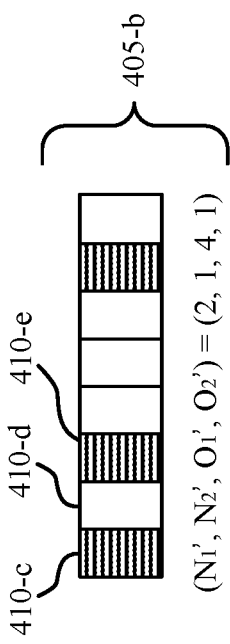
Figure 4:
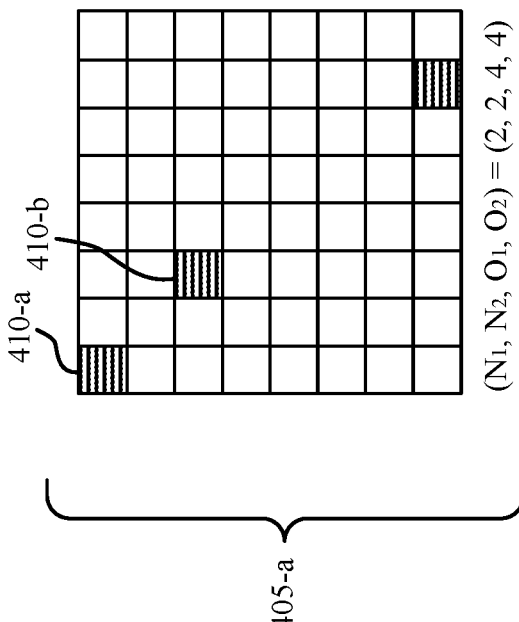
Figure 4:

FIG. 4 illustrates an example of a codebook parameter adaption scheme 400 that supports CSI codebook parameter configuration for dynamic antenna port adaptation in accordance with one or more aspects of the present disclosure. The codebook parameter adaption scheme 400 illustrates bitmaps used by a UE 115 to derive codebook parameters for a supplemental codebook from codebook parameters configured for a base codebook, as described herein, including with reference to FIGS. 2 and 3. The codebook parameter adaption scheme 400 illustrates an adaptation or derivation of a second bitmap 405-b representing an RI or PMI restriction for a supplemental codebook from a first bitmap 405-a that indicates a first RI or PMI restriction for a base codebook. The first bitmap 405-a may be indicated to the UE 115 via a CSI report configuration, as described herein with reference to FIG. 3.

In some implementations, the values of antenna parameters $N_1$ and $N_2$ corresponding to a codebook may be indicated by a network entity via a bitmap parameter (e.g., a higher layer parameter, n1-n2) in a CSI report configuration. The bitmap parameter may be indicated as a bit sequence. In some aspects, the bitmap parameter may be mapped to PMI for a codebook, as illustrated in FIG. 4. For example, a bitmap 405 may be formed from a bit sequence $a_{A_c-1}, \ldots, a_1, a_0$, where $a_0$ may be a least significant bit 410, $a_{A_c-1}$ may be a most significant bit 410. One or more bits 410 that are set to a first value (e.g., zero) may indicate a PMI restriction (e.g., that PMI reporting is not allowed to correspond to any precoder associated with the bit). The quantity $A_c$ may correspond to a total quantity of bits, given by Equation 9 below.

$$A_c = N_1 O_1 N_2 O_2 \tag{9}$$

In some examples, if a quantity of layers, v, is not $v \in \{3, 4\}$ or a quantity of antenna ports is not 16, 24, or 32, the bit corresponding to $a_{N_2 O_2 l+m}$ may be associated with all precoders based on the value of quantity $v_{l,m}$, where values for l and m are shown below in Equations 10 and 11.

$$l = 0, \ldots, N_1 O_1 - 1 \tag{10}$$

$$m = 0, \ldots, N_2 O_2 - 1 \tag{11}$$

Alternatively, if the quantity of layers is $v \in \{3, 4\}$ and the quantity of antenna ports is 16, 24, or 32, bits corresponding to $a_{(N_2 O_2(2l-1)+m) mod(N_1 O_1 N_2 O_2)}$, $a_{N_2 O_2(2l)+m}$, and $a_{N_2 O_2(2l+1)+m}$ may each be associated with all precoders based on the value of quantity m from equation 10 and the value of quantity $\tilde{v}_{l,m}$, where values of m are given by Equation 11 and values of l are given by Equation 12, shown below. If one or more of the associated bits is zero, then PMI reporting may not be allowed to correspond to any precoder based on the quantity $\tilde{v}_{l,m}$.

$$l = 0, \ldots, N_1 O_1 - 1 \tag{12}$$

As described herein, a UE 115 may determine a PMI restriction for an additional (e.g., supplemental) codebook based on one or more PMI restrictions determined or indicated for a first codebook (e.g., the main or base codebook) and a rule, such that a network entity 105 may refrain from indicating the PMI restriction (e.g., and other codebook parameters) for each codebook via a CSI report configuration. The rule may be based on values of $N_1$, $N_2$, $O_1$, and $O_2$ corresponding to an antenna configuration for the first codebook, and the values $N_1'$, $N_2'$, $O_1'$, and $O_2'$, which may correspond to an antenna configuration for the additional codebook. In some cases, the rule may be indicated to the UE 115 via control signaling or configured at the UE 115 (e.g., preconfigured). In some examples, the rule may specify a relationship between bits 410 of a first bit sequence corresponding to the first codebook and a second bit sequence corresponding to the additional codebook. For instance, the rule may define a relationship between bits 410 of bitmap 405-a and bits 410 of the bitmap 405-b (e.g., bit $a_{N_2 O_2 l+m}$ Of the first bit sequence and the corresponding bit $a_{N_2 O_2 l+m}'$ of the second bit sequence).

The bitmap 405-b, corresponding to the supplemental codebook, may be determined (e.g., by the UE 115). For example, the UE 115 may use the rule, the parameters corresponding to the first codebook (e.g., bitmap 405-a and the values of $N_1$, $N_2$, $O_1$, and $O_2$), and values of $N_1'$, $N_2'$, $O_1'$, and $O_2'$, which may correspond to an antenna configuration for the additional codebook, to determine PMI restrictions for the supplemental codebook. In some cases, such as when the antenna configuration of the additional codebook varies from the antenna configuration of the first codebook, the values of $N_1'$, $N_2'$, $O_1'$, and $O_2'$ may be different from the values of $N_1$, $N_2$, $O_1$, and $O_2$. As such, a quantity of bits 410 in the bitmap 405-*b* may be different than a quantity of bits 410 in the bitmap 405-*a*, as illustrated in FIG. 4.

In the example of FIG. 4, the first codebook corresponding to the bitmap 405-*a* may be configured with values for $(N_1, N_2, O_1, O_2)$ of (2, 2, 4, 4). A quantity of rows in the bitmap 405-*a* may correspond to the value $N_1O_1$, which in this example may be eight. Similarly, a quantity of columns in the bitmap 405-*a* may correspond to the value $N_2O_2$, which in this example may be eight. The additional codebook corresponding to the bitmap 405-*b* may be configured with values for $(N_1', N_2', O_1', O_2')$ of (2, 1, 4, 1). As such, the bitmap 405-*b* may include one row and eight columns (e.g., $N_1'O_1'=1$ and $N_2'O_2'=8$).

In some examples, the UE 115 may determine PMI restrictions for the bitmap 405-*b* based on the PMI restrictions in the bitmap 405-*a* and the rule or a rule set. The rule set may define a relationship between the bitmap 405-*a* and the bitmap 405-*b*, such that the UE 115 may map entries in the bitmap 405-*a* to entries in the bitmap 405-*b*. In the example of FIG. 4, the bitmap 405-*a* and the bitmap 405-*b* may have a same quantity of bits 410 in at least one dimension (e.g., eight bits 410 in the horizontal direction), but different quantities of bits in the vertical direction. Thus, the rule may instruct the UE 115 to compress the bits 410 from the bitmap 405-*a* to adapt to or map to the bitmap 405-*b*. For example, if any bit 410 in the first column of the bitmap 405-*a* indicates a PMI restriction (e.g., has a value of zero), the UE 115 may determine that the bit 410-*c* in the first column of the bitmap 405-*b* should indicate a PMI restriction (e.g., have a value of 0).

In this example, the bit 410-*a* in the first column of the bitmap 405-*a* indicates a PMI restriction, and as such the UE 115 may determine that the bit 410-*c* in the first column of the bitmap 405-*b* should indicate a PMI restriction. Further, the UE 115 may determine that, because there is no bit 410 in the second column of bitmap 405-*a* that indicates a PMI restriction, the bit 410-*d* in the second column of the bitmap 405-*b* should not indicate a PMI restriction (e.g., should have a value of one). The UE 115 may similarly determine that the bit 410-*e* in the third column of the bitmap 405-*b* should indicate a PMI restriction based on the bit 410-*b* in the third column of the bitmap 405-*a* indicating the PMI restriction. The UE 115 may similarly determine that the seventh column of the bitmap 405-*b* includes a PMI restriction based on the seventh column of the bitmap 405-*a* including a PMI restriction.

The UE 115 may perform similar derivation procedures to determine other codebook parameters. For example, the UE 115 may determine an RI restriction for an additional (e.g., supplemental) codebook based on antenna parameters for a first codebook (e.g., the main or base codebook) and the additional codebook, RI restrictions associated with the first codebook, and a rule or rule set. For example, the rule set may indicate that if the additional codebook has a relatively small quantity of CSI-RS antenna ports, while the first codebook has a relatively large quantity of CSI-RS antenna ports and supports a high rank (e.g., high RI), the UE 115-*a* may determine that a high rank hypothesis is not to be used when computing CSI for the additional codebook. In some cases, the UE 115-*a* may determine not to use high rank hypotheses if the CSI-RS antenna ports of the additional codebook are below a threshold quantity, the CSI-RS antenna ports of the first codebook are above a threshold quantity, the difference in the quantity of CSI-RS antenna ports of the first codebook and the additional codebook are above a threshold quantity, or any combination thereof.

Accordingly, by utilizing a configured rule or rule set for codebook parameter adaptation as described herein, the UE 115 may determine PMI restrictions for the bits 410 of the bitmap 405-*b* associated with a supplemental codebook based on PMI restrictions for the bits 410 of the bitmap 405-*a* associated with a base codebook. In some aspects described herein, the UE 115 may determine RI restrictions for a supplemental codebook utilizing a similar rule or set of rules for codebook parameter adaptation and an RI restriction associated with or configured for the base codebook.

Figure 5:
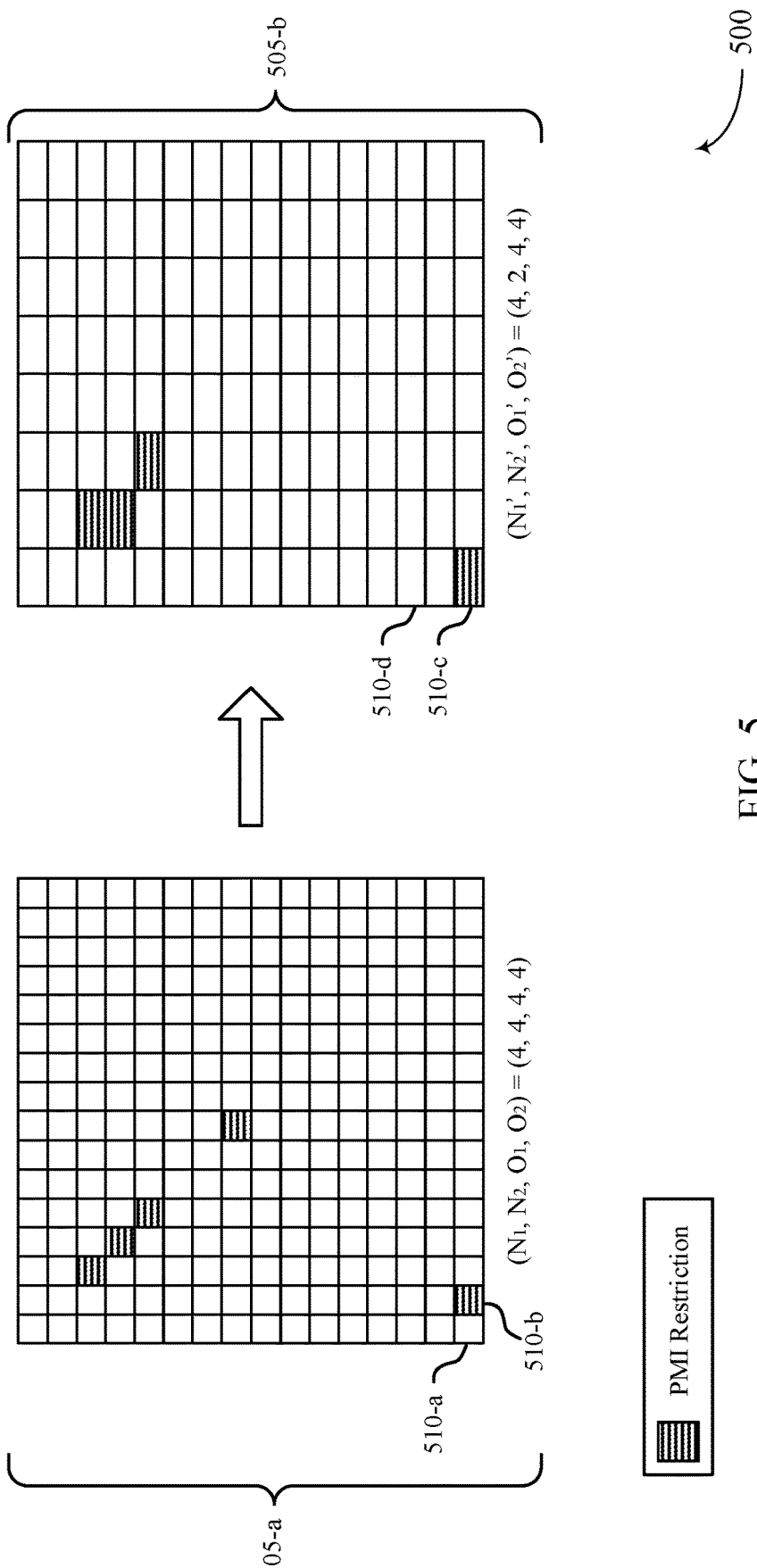
FIG. 5 illustrates an example of a codebook parameter adaption scheme that supports CSI codebook parameter configuration for dynamic antenna port adaptation in accordance with one or more aspects of the present disclosure.

FIG. 5 illustrates an example of a codebook parameter adaption scheme 500 that supports CSI codebook parameter configuration for dynamic antenna port adaptation in accordance with one or more aspects of the present disclosure. The codebook parameter adaptation scheme 500 may implement or be implemented by aspects of the wireless communications systems 100 and 200 described herein with reference to FIGS. 1 and 2. For example, the codebook parameter adaption scheme 500 illustrates bitmaps 505 used by a UE 115 to determine CSI restrictions for a supplemental codebook from a base codebook, as described herein with reference to FIGS. 2-4. The codebook parameter adaption scheme 500 may represent an example of the codebook parameter adaption scheme 400 described herein with reference to FIG. 4. For example, the codebook parameter adaption scheme 500 illustrates a bitmap 505-*a* and a bitmap 505-*b*, which may be examples of bitmaps 405 as described herein with reference to FIG. 4.

The bitmap 505-*a* may correspond to a bitmap indicated for a first codebook (e.g., a main or base codebook) and the bitmap 505-*b* may correspond to a bitmap derived by a UE 115 for a supplemental codebook (e.g., an additional codebook). The first codebook may be associated with a first set of antenna configuration parameters, $N_1$, $N_2$, $O_1$, and $O_2$, and the second codebook may be associated with a second set of antenna configuration parameters, $N_1'$, $N_2'$, $O_1'$, and $O_2'$, as described herein with reference to FIGS. 2-4. In some cases, such as when the antenna configuration of the additional codebook varies from the antenna configuration of the first codebook, the values of $N_1'$, $N_2'$, $O_1'$, and $O_2'$ may be different from the values of $N_1$, $N_2$, $O_1$, and $O_2$. As such, the bitmap 505-*b* may correspond to a bit sequence with a different quantity of bits 510, as illustrated in FIG. 5.

As described with reference to FIG. 4, the UE 115 may determine the bitmap 505-*b*, which may represent PMI restrictions for the supplemental codebook, based on the PMI restrictions indicated via the first bitmap 505-*a* associated with the first codebook and a rule for codebook parameter adaptation. The rule may specify a relationship between bits 510 of the bitmap 505-*a* and the bitmap 505-*b*. The rule may be based on values of $N_1$, $N_2$, $O_1$, and $O_2$ corresponding to an antenna configuration for the first codebook, and the values $N_1'$, $N_2'$, $O_1'$, and $O_2'$ corresponding to an antenna configuration for the additional codebook.

As illustrated in FIG. 5, the first codebook corresponding to bitmap 505-*a* may be configured with values for $(N_1, N_2, O_1, O_2)$ of (4, 4, 4, 4). A quantity of rows in bitmap 505-*a* may correspond to the value $N_1O_1$, which in this example may be 16. Similarly, a quantity of columns in bitmap 505-*a* may correspond to the value $N_2O_2$, which in this example may be 16. The additional codebook corresponding to bitmap 505-*b* may be configured (or determined by the UE 115) to have values for $(N_1', N_2', O_1', O_2')$ of (4, 2, 4, 4). As such, the bitmap 505-*b* may have 16 rows and eight columns.

In the example of FIG. 5, the rule may indicate that two bits 510 of bitmap 505-*a* may correspond to a single bit 510 of the bitmap 505-a (e.g., based on a ratio of values of the respective antenna port configuration parameters). That is, the UE 115 may associate two columns of the bitmap 505-a with a single column of the bitmap 505-b. For example, the UE 115 may determine whether the bit 510-c in the bitmap 505-b should indicate a PMI restriction (e.g., have a value of 0) based on whether either of the bit 510-a or the bit 510-b indicates a PMI restriction (e.g., has a value of 0). In this example, the UE 115 may determine that the bit 510-c should indicate a PMI restriction because the bit 510-b indicates a PMI restriction. The UE 115 may determine that neither of the two bits 510 in the bitmap 505-a that are mapped to the bit 510-d of the bitmap 505-b indicate a PMI restriction. As such, the UE 115 may determine that the bit 510-d of the bitmap 505-b should not indicate a PMI restriction.

The UE 115 may accordingly utilize the rule (e.g., relationship between bits 510) to determine PMI restrictions for each of the bits 510 in the bitmap 505-b. As described herein with reference to FIG. 4, in some aspects described herein, the UE 115 may determine RI restrictions for a supplemental codebook utilizing a similar rule or set of rules for codebook parameter adaptation and an RI restriction associated with or configured for the base codebook. The UE 115 may thereby derive codebook parameters, which may reduce overhead and complexity while maintaining reliable communications.

Figure 6:
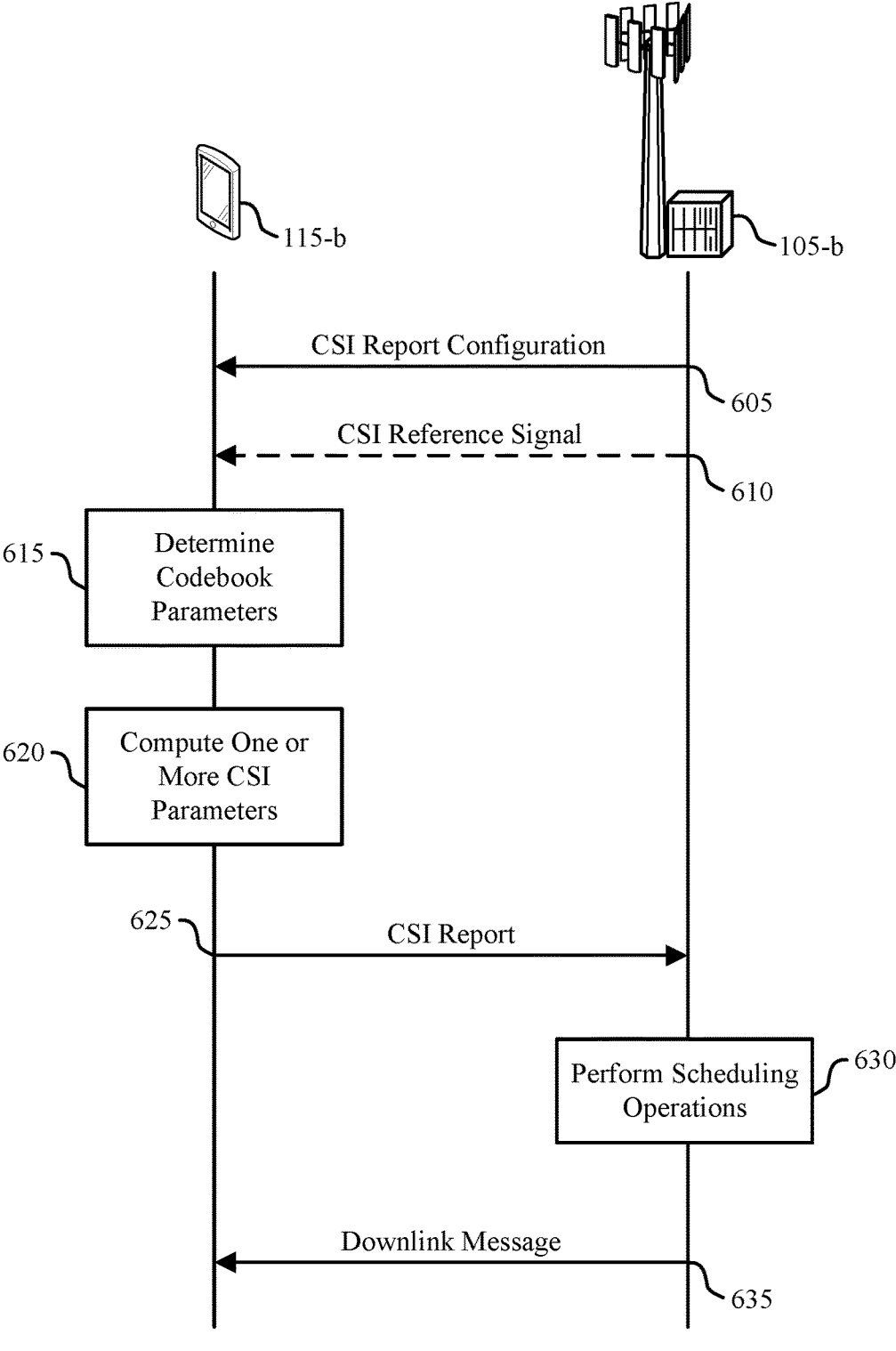
FIG. 6 illustrates an example of a process flow that supports CSI codebook parameter configuration for dynamic antenna port adaptation in accordance with one or more aspects of the present disclosure.

FIG. 6 illustrates an example of a process flow 600 that supports CSI codebook parameter configuration for dynamic antenna port adaptation in accordance with one or more aspects of the present disclosure. For example, process flow 600 illustrates communications between a UE 115-b and a network entity 105-b, which may be examples of corresponding devices as described herein, including with reference to FIGS. 1-5.

At 605, the network entity 105-b may transmit a CSI report configuration to the UE 115-b. The CSI report configuration may include (e.g., contain or indicate) one or more sets of codebook parameters associated with one or more codebooks. For example, the control message may include a first set of codebook parameters associated with a first codebook (e.g., a base codebook or a main codebook). Each of the one or more sets of codebook parameters may include an antenna port configuration, a rank restriction parameter, one or more PMI restrictions, or any combination thereof. In some examples, the CSI report configuration may indicate one or more CSI-RS resources (e.g., in a CSI-RS resource set) to be used when, for example, the UE 115-b computes CSI information (e.g., performs CSI measurements). In some aspects, a codebook of the one or more codebooks may be associated with the CSI-RS resource.

In some aspects, the UE 115-b may determine that the first codebook is a base codebook (e.g., main codebook) based on the codebook being associated with CSI-RS resource, based on a quantity of antenna ports associated with the first codebook, based on a quantity of antenna ports associated with a second codebook (e.g., an additional or supplemental codebook), based on a rule for base codebook selection, or any combination thereof. Additionally, or alternatively, the control message or some other control signaling transmitted to the UE 115-b may indicate that the first codebook is the base codebook (e.g., main codebook).

At 610, the network entity 105-b may transmit one or more CSI-RSs to the UE 115-b. The UE 115-b may receive the one or more CSI-RSs associated with CSI computation. Although the CSI-RSs are illustrated as being transmitted after the control message in FIG. 6, it is to be understood that, in some examples, the network entity 105-b may transmit the one or more CSI-RSs prior to or at the same time as transmitting the control message.

At 615, the UE 115-b may determine one or more sets of codebook parameters associated with one or more supplemental codebooks. For example, the UE 115-b may determine a set of codebook parameters for at least a second codebook based on the set of codebook parameters associated with the base codebook and on a rule for codebook parameter adaptation. In some cases, the rule for codebook parameter adaptation may be based on one or more PMI restriction parameters associated with the base codebook, an RI restriction parameter associated with the base codebook, an antenna port configuration associated with the base codebook, an antenna port configuration associated with the second codebook, or any combination thereof. In some examples, the UE 115-b may determine a set of codebook parameters for an additional codebook based on an indication of the set of codebook parameters in the control message. The set of codebook parameters may include a PMI restriction, an RI restriction, or both, as described herein with reference to FIGS. 4 and 5.

At 620, the UE 115-b may compute one or more CSI parameters based on the base codebook and, in some cases, the one or more additional codebooks. In some examples, the UE 115-b may determine not to compute some CSI parameters, such as PMI parameters, such as when bits for a DFT vector (e.g., $\vartheta_{l,m}$ or $\bar{\vartheta}_{l,m}$) are set as to not allow PMI reporting by the UE 115-b to the network entity 105-b. In some examples, the UE 115-b may compute wideband CSI parameters and subband CSI parameters according to the base codebook and one or more additional codebooks, and the UE 115-b may sort the computed CSI according to one or more parameters (e.g., spectral efficiency).

At 625, the UE 115-b may transmit a CSI report to the network entity 105-b that indicates a set of CSI parameters (e.g., CQI parameters, PMI parameters, or other parameters computed by the UE 115-b) for the main codebook and, in some cases, one or more of the additional codebooks. In some examples, the UE 115-b may transmit wideband CSI parameters, subband CSI parameters, or both computed in accordance with at least one of the main codebook and the additional codebooks. The UE 115-b may select which CSI parameters to report based on one or more configured restrictions for reporting CSI parameters, as described herein with reference to FIGS. 2-5.

At 630, the network entity 105-b may perform scheduling operations based on the received CSI parameters. For example, the network entity 105-b may select resources (e.g., channel or beam resources) based on the received CSI parameters. At 635, the network entity 105-b may transmit a downlink message in accordance with the scheduling operations and based on the received CSI parameters. In some aspects, the network entity 105-b may transmit control information (e.g., via a physical downlink control channel (PDCCH)) that schedules the downlink message. In such cases, the network entity 105-b may indicate the scheduling operations via the control information.

Figure 7:
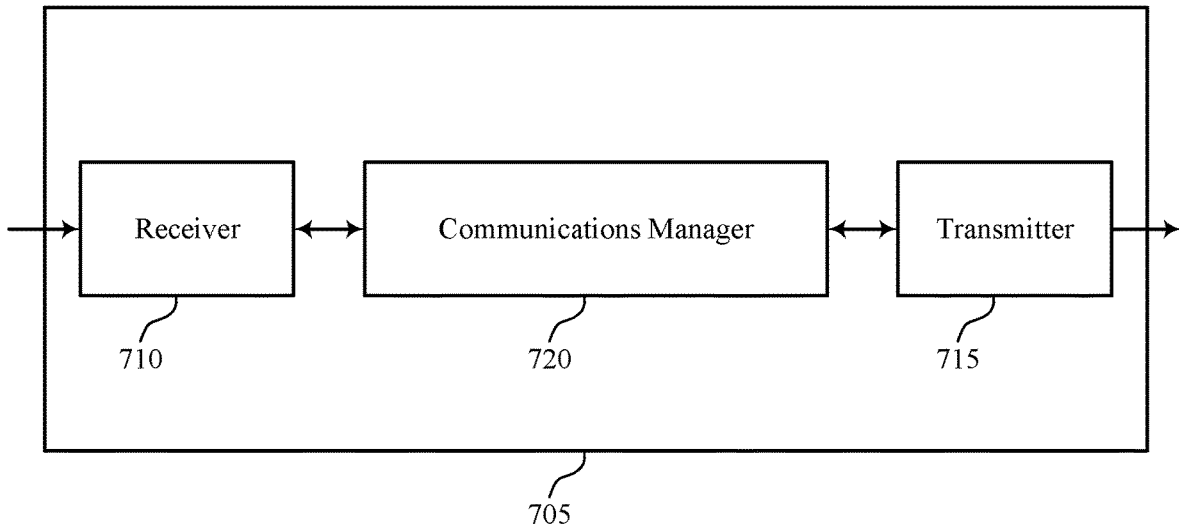
FIGS. 7 and 8 show block diagrams of devices that support CSI codebook parameter configuration for dynamic antenna port adaptation in accordance with one or more aspects of the present disclosure.

FIG. 7 shows a block diagram 700 of a device 705 that supports CSI codebook parameter configuration for dynamic antenna port adaptation in accordance with one or more aspects of the present disclosure. The device 705 may be an example of aspects of a UE 115 as described herein. The device 705 may include a receiver 710, a transmitter 715, and a communications manager 720. The device 705 may also include a processor (not shown). Each of these components may be in communication with one another (e.g., via one or more buses).

The receiver 710 may provide a means for receiving information such as packets, user data, control information, or any combination thereof associated with various information channels (e.g., control channels, data channels, information channels related to CSI codebook parameter configuration for dynamic antenna port adaptation). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to CSI codebook parameter configuration for dynamic antenna port adaptation). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of CSI codebook parameter configuration for dynamic antenna port adaptation as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. For example, the communications manager 720 may be configured as or otherwise support a means for receiving, via a control message, a CSI report configuration including a first set of codebook parameters associated with at least a first codebook, the first codebook associated with a CSI measurement at the UE. The communications manager 720 may be configured as or otherwise support a means for determining a second set of codebook parameters associated with a second codebook based on the first set of codebook parameters associated with the first codebook. The communications manager 720 may be configured as or otherwise support a means for transmitting, via a CSI report, a respective set of CSI parameters for each of the first codebook and the second codebook based on the first set of codebook parameters, the second set of codebook parameters, and a CSI computation at the UE.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for more efficient utilization of communication resources and reduced power consumption.

Figure 8:
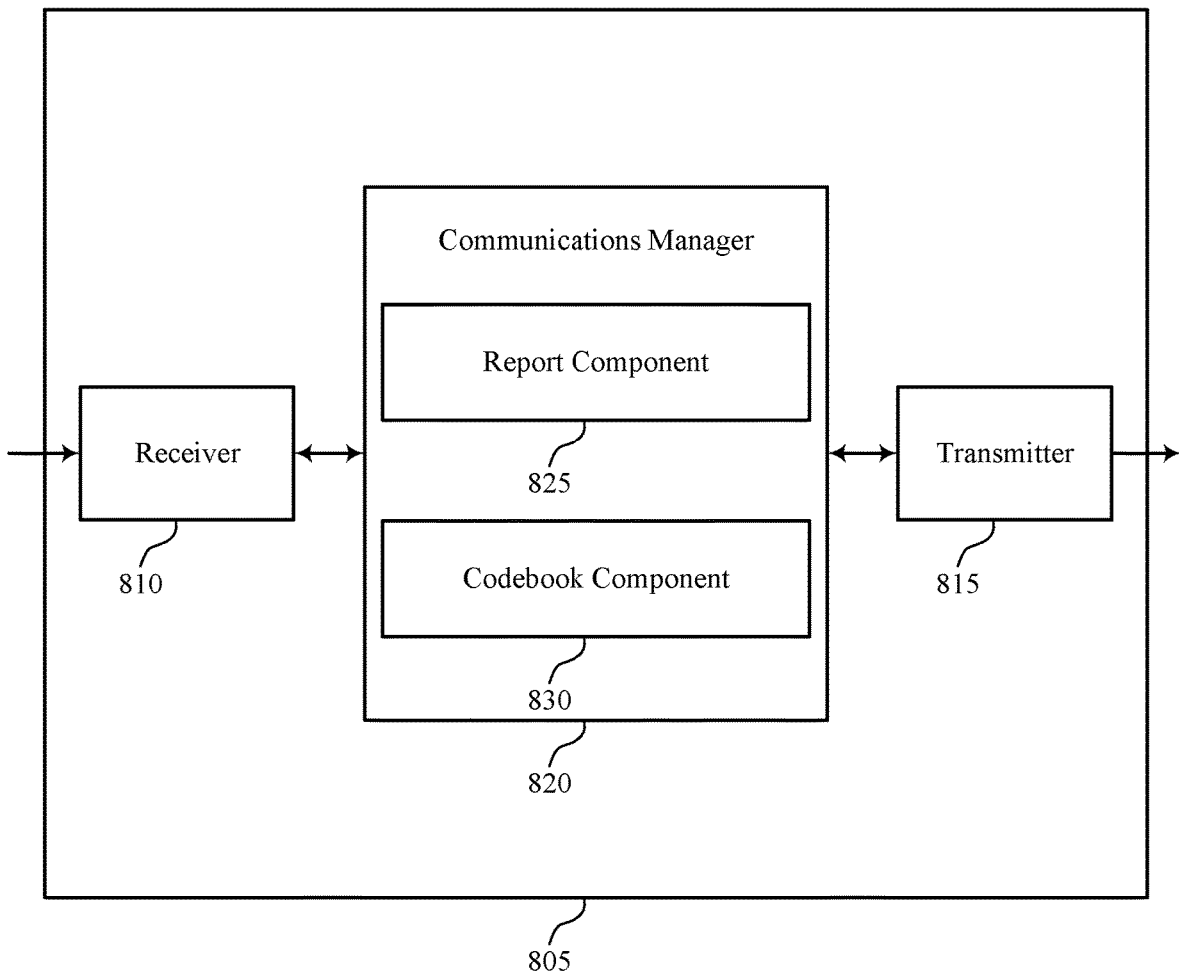

FIG. 8 shows a block diagram 800 of a device 805 that supports CSI codebook parameter configuration for dynamic antenna port adaptation in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor (not shown). Each of these components may be in communication with one another (e.g., via one or more buses).

The receiver 810 may provide a means for receiving information such as packets, user data, control information, or any combination thereof associated with various information channels (e.g., control channels, data channels, information channels related to CSI codebook parameter configuration for dynamic antenna port adaptation). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to CSI codebook parameter configuration for dynamic antenna port adaptation). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of CSI codebook parameter configuration for dynamic antenna port adaptation as described herein. For example, the communications manager 820 may include a report component 825 a codebook component 830, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a UE in accordance with examples as disclosed herein. The report component 825 may be configured as or otherwise support a means for receiving, via a control message, a CSI report configuration including a first set of codebook parameters associated with at least a first codebook, the first codebook associated with a CSI measurement at the UE. The codebook component 830 may be configured as or otherwise support a means for determining a second set of codebook parameters associated with a second codebook based on the first set of codebook parameters associated with the first codebook. The report component 825 may be configured as or otherwise support a means for transmitting, via a CSI report, a respective set of CSI parameters for each of the first codebook and the second codebook based on the first set of codebook parameters, the second set of codebook parameters, and a CSI computation at the UE.

Figure 9:
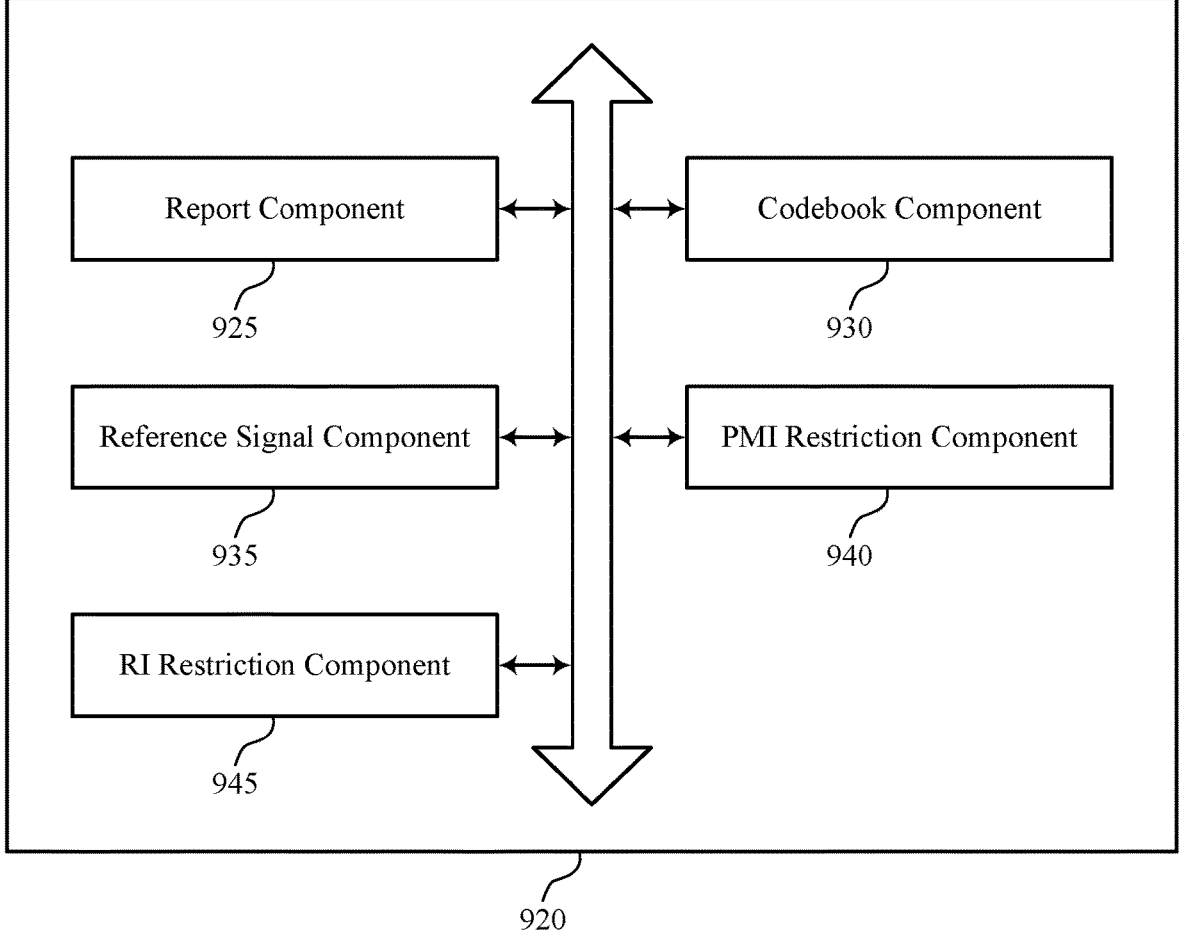
FIG. 9 shows a block diagram of a communications manager that supports CSI codebook parameter configuration for dynamic antenna port adaptation in accordance with one or more aspects of the present disclosure.

FIG. 9 shows a block diagram 900 of a communications manager 920 that supports CSI codebook parameter configuration for dynamic antenna port adaptation in accordance with one or more aspects of the present disclosure. The communications manager 920 may be an example of aspects of a communications manager 720, a communications manager 820, or both, as described herein. The communications manager 920, or various components thereof, may be an example of means for performing various aspects of CSI codebook parameter configuration for dynamic antenna port adaptation as described herein. For example, the communications manager 920 may include a report component 925, a codebook component 930, a reference signal component 935, a PMI restriction component 940, a RI restriction component 945, or any combination thereof. Each of these components may communicate, directly or indirectly, with one another (e.g., via one or more buses).

The communications manager 920 may support wireless communication at a UE in accordance with examples as disclosed herein. The report component 925 may be configured as or otherwise support a means for receiving, via a control message, a CSI report configuration including a first set of codebook parameters associated with at least a first codebook, the first codebook associated with a CSI measurement at the UE. The codebook component 930 may be configured as or otherwise support a means for determining a second set of codebook parameters associated with a second codebook based on the first set of codebook parameters associated with the first codebook. In some examples, the report component 925 may be configured as or otherwise support a means for transmitting, via a CSI report, a respective set of CSI parameters for each of the first codebook and the second codebook based on the first set of codebook parameters, the second set of codebook parameters, and a CSI computation at the UE.

In some examples, to support transmitting the respective sets of CSI parameters, the report component 925 may be configured as or otherwise support a means for transmitting, via the CSI report, a first set of CSI parameters including first wideband CSI parameters associated with the first codebook and first subband CSI parameters associated with the first codebook. In some examples, to support transmitting the respective sets of CSI parameters, the report component 925 may be configured as or otherwise support a means for transmitting, via the CSI report, a second set of CSI parameters including second wideband CSI parameters associated with the second codebook, where the first set of CSI parameters and the second set of CSI parameters include at least CQI parameters, PMI parameters, or both.

In some examples, the codebook component 930 may be configured as or otherwise support a means for receiving a control signal that indicates the first codebook is a base codebook, where transmitting both the first wideband CSI parameters and the first subband CSI parameters associated with the first codebook is based on the indication that the first codebook is the base codebook.

In some examples, the codebook component 930 may be configured as or otherwise support a means for determining that the first codebook is a base codebook based on a first quantity of antenna ports associated with the first codebook, a second quantity of antenna ports associated with the second codebook, and a rule for base codebook selection, where transmitting both the first wideband CSI parameters and the first subband CSI parameters associated with the first codebook is based on the first codebook being the base codebook.

In some examples, the codebook component 930 may be configured as or otherwise support a means for determining that the first codebook is a base codebook based on the first codebook being associated with a CSI-RS resource in a CSI-RS resource set indicated via the CSI report configuration, where transmitting both the first wideband CSI parameters and the first subband CSI parameters associated with the first codebook is based on the first codebook being the base codebook.

In some examples, to support transmitting the respective sets of CSI parameters, the report component 925 may be configured as or otherwise support a means for transmitting, via the CSI report, a respective set of wideband CSI parameters for each of the first codebook and the second codebook, where the respective sets of wideband CSI parameters include at least CQI parameters, PMI parameters, or both.

In some examples, to support transmitting the respective sets of CSI parameters, the report component 925 may be configured as or otherwise support a means for transmitting, via the CSI report, a respective set of subband CSI parameters and a respective set of wideband CSI parameters for each of the first codebook and the second codebook, where the respective sets of subband CSI parameters and the respective sets of wideband CSI parameters include at least CQI parameters, PMI parameters, or both.

In some examples, to support determining the second set of codebook parameters, the codebook component 930 may be configured as or otherwise support a means for determining the second set of codebook parameters based on the first set of codebook parameters associated with the first codebook and a rule for codebook parameter adaptation.

In some examples, the first set of codebook parameters includes a first antenna port configuration and a first PMI restriction parameter, and to support determining the second set of codebook parameters, the PMI restriction component 940 may be configured as or otherwise support a means for determining a second PMI restriction parameter associated with the second codebook based on the rule for codebook parameter adaptation, where the rule for codebook parameter adaptation is based on the first PMI restriction parameter, the first antenna port configuration, and a second antenna port configuration associated with the second codebook.

In some examples, the first set of codebook parameters includes a first antenna port configuration and a first rank restriction parameter, and to support determining the second set of codebook parameters, the RI restriction component 945 may be configured as or otherwise support a means for determining a second rank restriction parameter associated with the second codebook based on the rule for codebook parameter adaptation, where the rule for codebook parameter adaptation is based on the first rank restriction parameter, the first antenna port configuration, and a second antenna port configuration associated with the second codebook.

In some examples, to support determining the second set of codebook parameters, the codebook component 930 may be configured as or otherwise support a means for determining the second set of codebook parameters based on an indication of the second set of codebook parameters in the CSI report configuration, where the CSI report configuration includes a set of multiple sets of codebook parameters associated with a set of multiple codebooks, the set of multiple sets of codebook parameters including at least the first set of codebook parameters associated with the first codebook and the second set of codebook parameters associated with the second codebook.

In some examples, the first set of codebook parameters includes a first antenna port configuration, a first PMI restriction, and a first rank restriction for the first codebook. In some examples, the second set of codebook parameters includes a second antenna port configuration, a second PMI restriction, and a second rank restriction for the second codebook.

In some examples, the reference signal component 935 may be configured as or otherwise support a means for receiving one or more CSI-RSs associated with the CSI computation at the UE. In some examples, the reference signal component 935 may be configured as or otherwise support a means for computing a first set of CSI parameters for the first codebook based on the one or more CSI-RSs and in accordance with the first set of codebook parameters. In some examples, the reference signal component 935 may be configured as or otherwise support a means for computing a second set of CSI parameters for the second codebook based on the one or more CSI-RSs and in accordance with the second set of codebook parameters, where the CSI report includes the first set of CSI parameters and the second set of CSI parameters.

Figure 10:
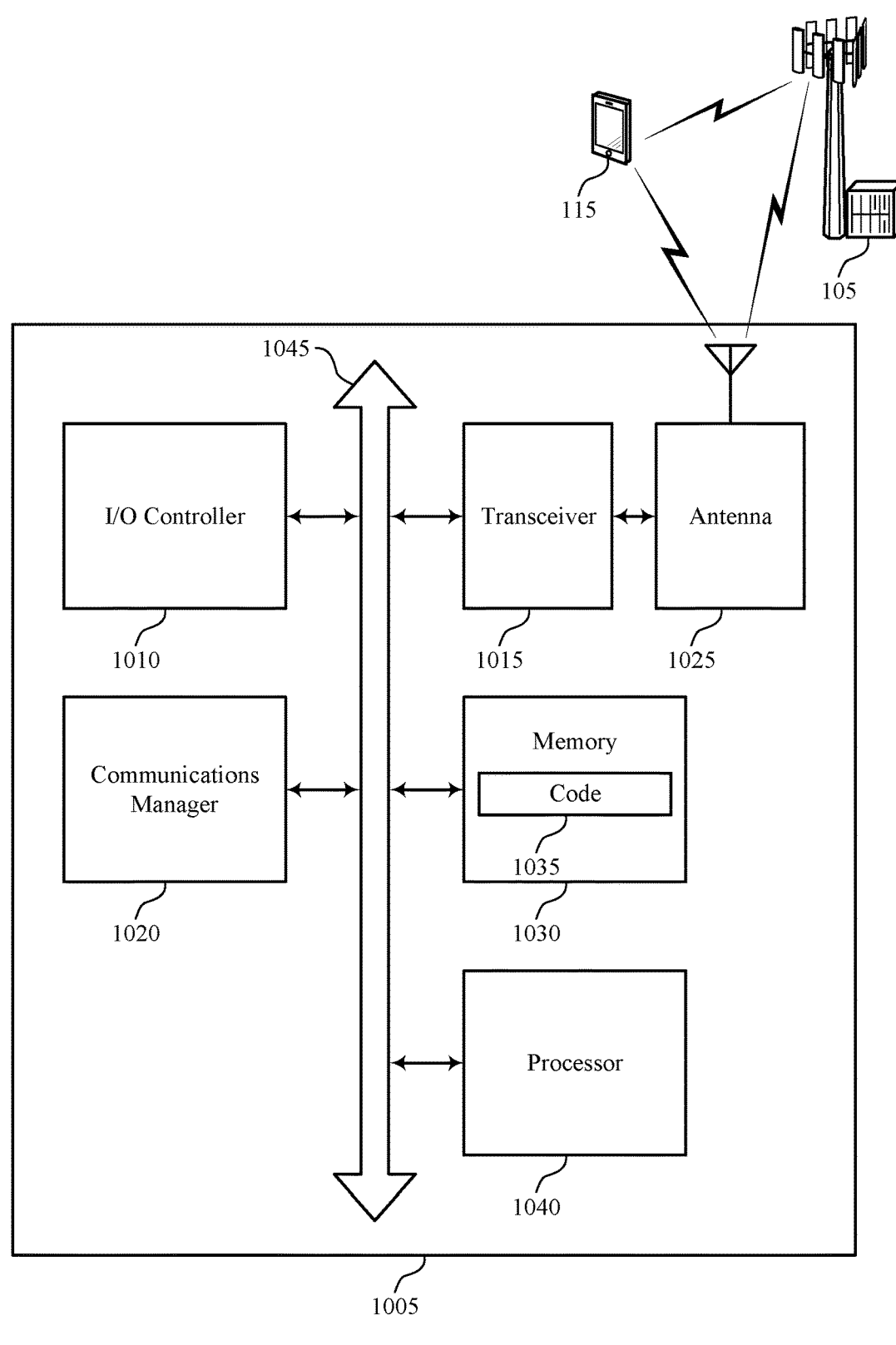
FIG. 10 shows a diagram of a system including a device that supports CSI codebook parameter configuration for dynamic antenna port adaptation in accordance with one or more aspects of the present disclosure.

FIG. 10 shows a diagram of a system 1000 including a device 1005 that supports CSI codebook parameter configuration for dynamic antenna port adaptation in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting CSI codebook parameter configuration for dynamic antenna port adaptation). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communication at a UE in accordance with examples as disclosed herein. For example, the communications manager 1020 may be configured as or otherwise support a means for receiving, via a control message, a CSI report configuration including a first set of codebook parameters associated with at least a first codebook, the first codebook associated with a CSI measurement at the UE. The communications manager 1020 may be configured as or otherwise support a means for determining a second set of codebook parameters associated with a second codebook based on the first set of codebook parameters associated with the first codebook. The communications manager 1020 may be configured as or otherwise support a means for transmitting, via a CSI report, a respective set of CSI parameters for each of the first codebook and the second codebook based on the first set of codebook parameters, the second set of codebook parameters, and a CSI computation at the UE.

By including or configuring the communications manager 1020 in accordance with examples as described herein, the device 1005 may support techniques for reduced power consumption, more efficient utilization of communication resources, and improved utilization of processing capability, among other examples.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of CSI codebook parameter configuration for dynamic antenna port adaptation as described herein, or the processor 1040 and the memory 1030 may be otherwise configured to perform or support such operations.

Figure 11:
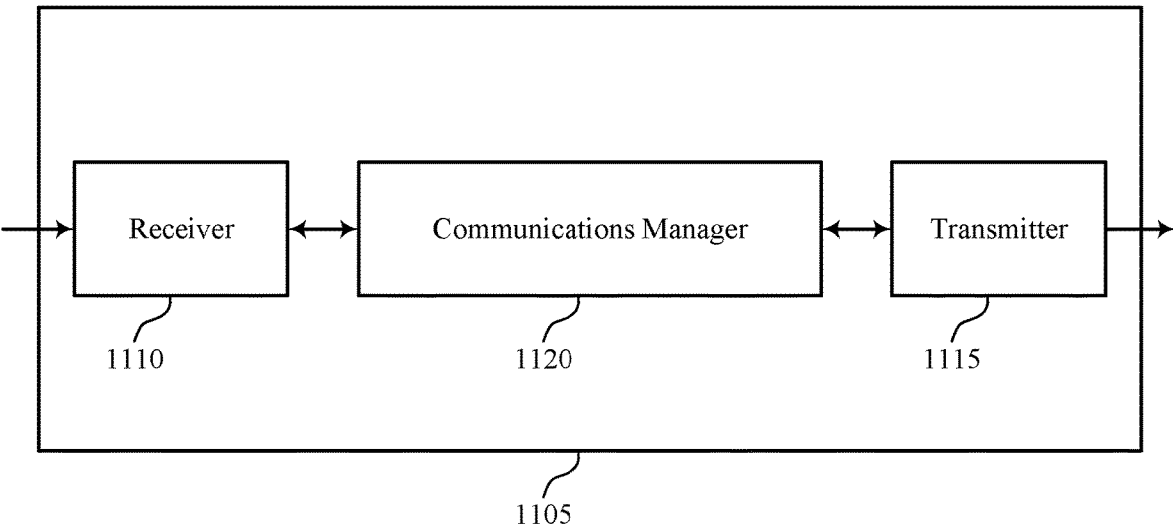
FIGS. 11 and 12 show block diagrams of devices that support CSI codebook parameter configuration for dynamic antenna port adaptation in accordance with one or more aspects of the present disclosure.

FIG. 11 shows a block diagram 1100 of a device 1105 that supports CSI codebook parameter configuration for dynamic antenna port adaptation in accordance with one or more aspects of the present disclosure. The device 1105 may be an example of aspects of a network entity 105 as described herein. The device 1105 may include a receiver 1110, a transmitter 1115, and a communications manager 1120. The device 1105 may also include a processor (not shown). Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of CSI codebook parameter configuration for dynamic antenna port adaptation as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network entity in accordance with examples as disclosed herein. For example, the communications manager 1120 may be configured as or otherwise support a means for transmitting, via a control message, a CSI report configuration including a first set of codebook parameters associated with at least a first codebook, the first codebook associated with a CSI measurement at a user equipment. The communications manager 1120 may be configured as or otherwise support a means for receiving, via a CSI report, a respective set of CSI parameters for each of the first codebook and a second codebook based on the first set of codebook parameters, a second set of codebook parameters associated with the second codebook, and a CSI computation.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for more efficient utilization of communication resources and reduced power consumption.

Figure 12:
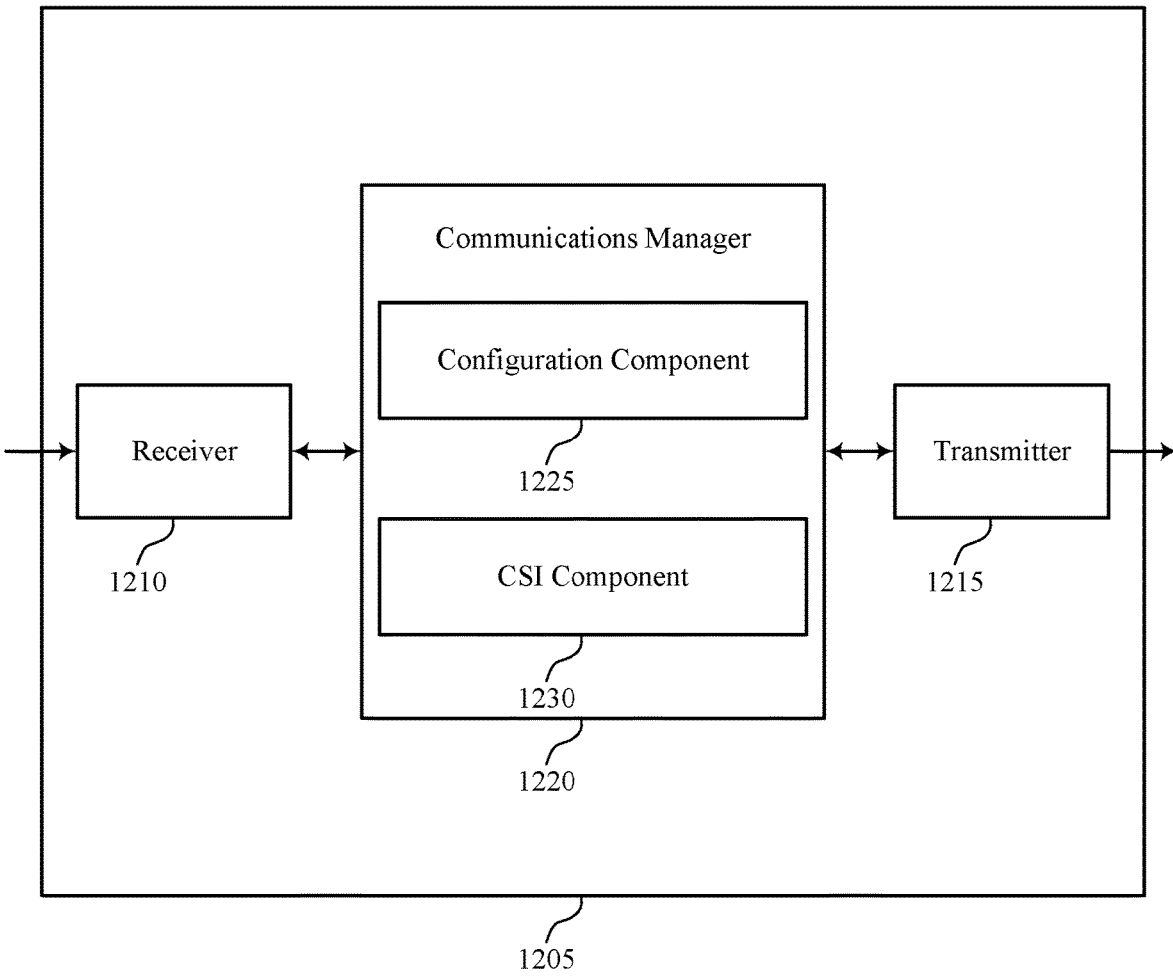

FIG. 12 shows a block diagram 1200 of a device 1205 that supports CSI codebook parameter configuration for dynamic antenna port adaptation in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205 may also include a processor (not shown). Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of CSI codebook parameter configuration for dynamic antenna port adaptation as described herein. For example, the communications manager 1220 may include a configuration component 1225 a CSI component 1230, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communication at a network entity in accordance with examples as disclosed herein. The configuration component 1225 may be configured as or otherwise support a means for transmitting, via a control message, a CSI report configuration including a first set of codebook parameters associated with at least a first codebook, the first codebook associated with a CSI measurement at a user equipment. The CSI component 1230 may be configured as or otherwise support a means for receiving, via a CSI report, a respective set of CSI parameters for each of the first codebook and a second codebook based on the first set of codebook parameters, a second set of codebook parameters associated with the second codebook, and a CSI computation.

Figure 13:
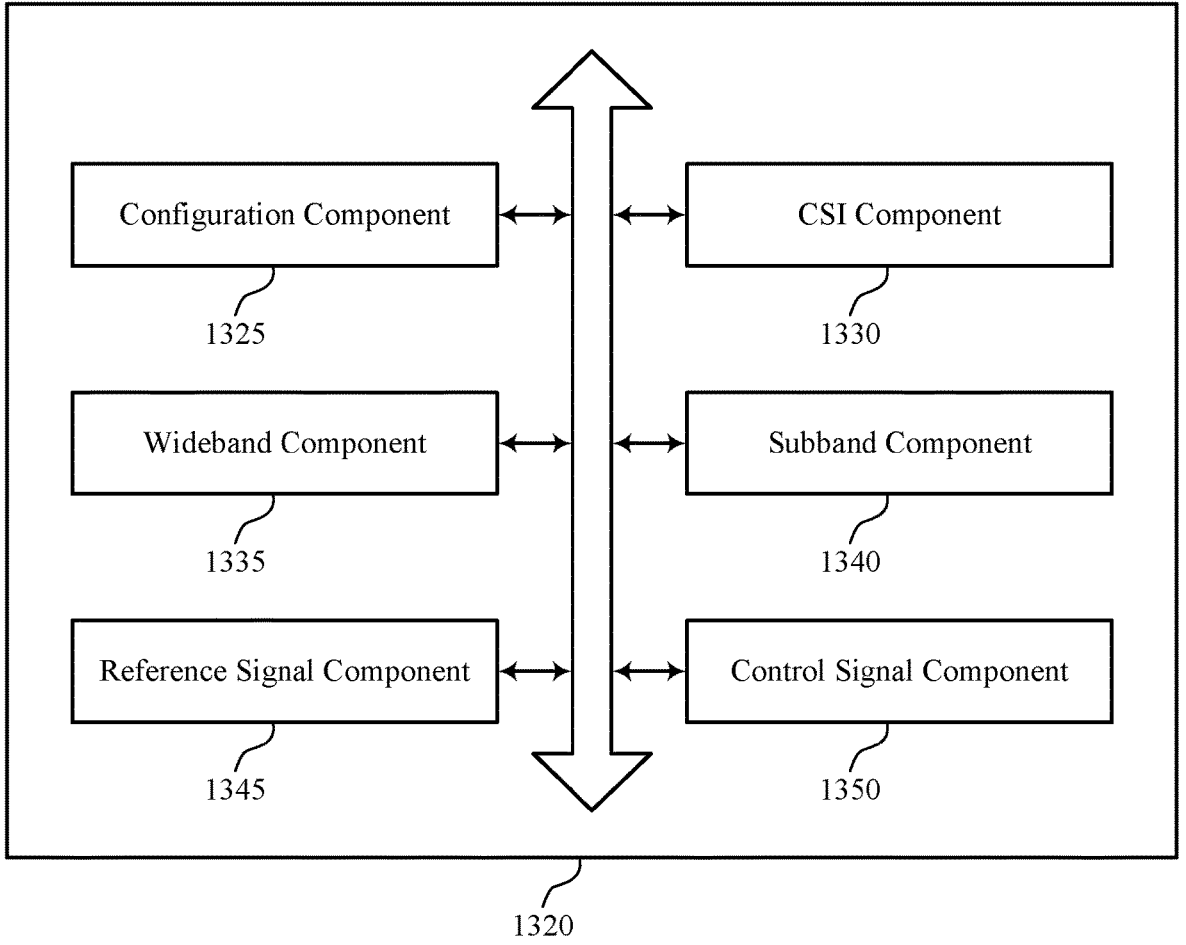
FIG. 13 shows a block diagram of a communications manager that supports CSI codebook parameter configuration for dynamic antenna port adaptation in accordance with one or more aspects of the present disclosure.
Figure 13:
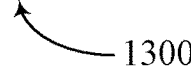

FIG. 13 shows a block diagram 1300 of a communications manager 1320 that supports CSI codebook parameter configuration for dynamic antenna port adaptation in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of CSI codebook parameter configuration for dynamic antenna port adaptation as described herein. For example, the communications manager 1320 may include a configuration component 1325, a CSI component 1330, a wideband component 1335, a subband component 1340, a reference signal component 1345, a control signal component 1350, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communication at a network entity in accordance with examples as disclosed herein. The configuration component 1325 may be configured as or otherwise support a means for transmitting, via a control message, a CSI report configuration including a first set of codebook parameters associated with at least a first codebook, the first codebook associated with a CSI measurement at a user equipment. The CSI component 1330 may be configured as or otherwise support a means for receiving, via a CSI report, a respective set of CSI parameters for each of the first codebook and a second codebook based on the first set of codebook parameters, a second set of codebook parameters associated with the second codebook, and a CSI computation.

In some examples, to support receiving the respective sets of CSI parameters, the CSI component 1330 may be configured as or otherwise support a means for receiving, via the CSI report, a first set of CSI parameters including first wideband CSI parameters associated with the first codebook and first subband CSI parameters associated with the first codebook. In some examples, to support receiving the respective sets of CSI parameters, the CSI component 1330 may be configured as or otherwise support a means for receiving, via the CSI report, a second set of CSI parameters including second wideband CSI parameters associated with the second codebook, where the first set of CSI parameters and the second set of CSI parameters each include at least CQI parameters, PMI parameters, or both.

In some examples, the control signal component 1350 may be configured as or otherwise support a means for transmitting a control signal that indicates the first codebook is a base codebook, where receiving both the first wideband CSI parameters and the first subband CSI parameters associated with the first codebook is based on the first codebook being the base codebook.

In some examples, to support receiving the respective sets of CSI parameters, the wideband component 1335 may be configured as or otherwise support a means for receiving, via the CSI report, a respective set of wideband CSI parameters for each of the first codebook and the second codebook, where the respective sets of wideband CSI parameters includes at least CQI parameters, PMI parameters, or both.

In some examples, to support receiving the respective sets of CSI parameters, the subband component 1340 may be configured as or otherwise support a means for receiving, via the CSI report, a respective set of subband CSI parameters and a respective set of wideband CSI parameters for each of the first codebook and the second codebook, where the respective sets of subband CSI parameters and the respective sets of wideband CSI parameters include at least CQI parameters, PMI parameters, or both.

In some examples, to support transmitting the CSI report configuration, the configuration component 1325 may be configured as or otherwise support a means for transmitting, via the CSI report configuration, a set of multiple sets of codebook parameters associated with a set of multiple codebooks, where the set of multiple sets of codebook parameters include at least the first set of codebook parameters associated with the first codebook and the second set of codebook parameters associated with the second codebook.

In some examples, the reference signal component 1345 may be configured as or otherwise support a means for transmitting one or more CSI-RSs associated with the CSI computation, where receiving the CSI report is based on the one or more CSI-RSs.

In some examples, the first set of codebook parameters includes a first antenna port configuration, a first PMI restriction, and a first rank restriction for the first codebook. In some examples, the second set of codebook parameters includes a second antenna port configuration, a second PMI restriction, and a second rank restriction for the second codebook.

Figure 14:
FIG. 14 shows a diagram of a system including a device that supports CSI codebook parameter configuration for dynamic antenna port adaptation in accordance with one or more aspects of the present disclosure.

FIG. 14 shows a diagram of a system 1400 including a device 1405 that supports CSI codebook parameter configuration for dynamic antenna port adaptation in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, a memory 1425, code 1430, and a processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. The transceiver 1410, or the transceiver 1410 and one or more antennas 1415 or wired interfaces, where applicable, may be an example of a transmitter 1115, a transmitter 1215, a receiver 1110, a receiver 1210, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory. In some cases, the code 1430 may not be directly executable by the processor 1435 but may cause a computer (e.g., when compiled and executed) to perform functions described herein. In some cases, the memory 1425 may contain, among other things, a BIOS which may control basic hardware or software operation such as the interaction with peripheral components or devices.

The processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1435 may be configured to operate a memory array using a memory controller. In some other cases, a memory controller may be integrated into the processor 1435. The processor 1435 may be configured to execute computer-readable instructions stored in a memory (e.g., the memory 1425) to cause the device 1405 to perform various functions (e.g., functions or tasks supporting CSI codebook parameter configuration for dynamic antenna port adaptation). For example, the device 1405 or a component of the device 1405 may include a processor 1435 and memory 1425 coupled with the processor 1435, the processor 1435 and memory 1425 configured to perform various functions described herein. The processor 1435 may be an example of a cloud-computing platform (e.g., one or more physical nodes and supporting software such as operating systems, virtual machines, or container instances) that may host the functions (e.g., by executing code 1430) to perform the functions of the device 1405.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the memory 1425, the code 1430, and the processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communication at a network entity in accordance with examples as disclosed herein. For example, the communications manager 1420 may be configured as or otherwise support a means for transmitting, via a control message, a CSI report configuration including a first set of codebook parameters associated with at least a first codebook, the first codebook associated with a CSI measurement at a user equipment. The communications manager 1420 may be configured as or otherwise support a means for receiving, via a CSI report, a respective set of CSI parameters for each of the first codebook and a second codebook based on the first set of codebook parameters, a second set of codebook parameters associated with the second codebook, and a CSI computation.

By including or configuring the communications manager 1420 in accordance with examples as described herein, the device 1405 may support techniques for reduced power consumption, more efficient utilization of communication resources, and improved utilization of processing capability, among other examples.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the processor 1435, the memory 1425, the code 1430, the transceiver 1410, or any combination thereof. For example, the code 1430 may include instructions executable by the processor 1435 to cause the device 1405 to perform various aspects of CSI codebook parameter configuration for dynamic antenna port adaptation as described herein, or the processor 1435 and the memory 1425 may be otherwise configured to perform or support such operations.

FIG. 15 shows a flowchart illustrating a method 1500 that supports CSI codebook parameter configuration for dynamic antenna port adaptation in accordance with one or more aspects of the present disclosure. The operations of the method 1500 may be implemented by a UE or its components as described herein. For example, the operations of the method 1500 may be performed by a UE 115 as described herein with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include receiving, via a control message, a CSI report configuration including a first set of codebook parameters associated with at least a first codebook, the first codebook associated with a CSI measurement at the UE. The operations of 1505 may be performed in accordance with examples as disclosed herein. In some examples, aspects of the operations of 1505 may be performed by a report component 925 as described herein with reference to FIG. 9.

At 1510, the method may include determining a second set of codebook parameters associated with a second codebook based at least in part on the first set of codebook parameters associated with the first codebook. The operations of 1510 may be performed in accordance with examples as disclosed herein. In some examples, aspects of the operations of 1510 may be performed by a codebook component 930 as described herein with reference to FIG. 9.

At 1515, the method may include transmitting, via a CSI report, a respective set of CSI parameters for each of the first codebook and the second codebook based at least in part on the first set of codebook parameters, the second set of codebook parameters, and a CSI computation at the UE. The operations of 1515 may be performed in accordance with examples as disclosed herein. In some examples, aspects of the operations of 1515 may be performed by a report component 925 as described herein with reference to FIG. 9.

FIG. 16 shows a flowchart illustrating a method 1600 that supports CSI codebook parameter configuration for dynamic antenna port adaptation in accordance with one or more aspects of the present disclosure. The operations of the method 1600 may be implemented by a UE or its components as described herein. For example, the operations of the method 1600 may be performed by a UE 115 as described herein with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1605, the method may include receiving, via a control message, a CSI report configuration including a first set of codebook parameters associated with at least a first codebook, the first codebook associated with a CSI measurement at the UE. The operations of 1605 may be performed in accordance with examples as disclosed herein. In some examples, aspects of the operations of 1605 may be performed by a report component 925 as described herein with reference to FIG. 9.

At 1610, the method may include determining a second set of codebook parameters associated with a second codebook based at least in part on the first set of codebook parameters associated with the first codebook. The operations of 1610 may be performed in accordance with examples as disclosed herein. In some examples, aspects of the operations of 1610 may be performed by a codebook component 930 as described herein with reference to FIG. 9.

At 1615, the method may include receiving one or more CSI-RSs associated with a CSI computation at the UE. The operations of 1615 may be performed in accordance with examples as disclosed herein. In some examples, aspects of the operations of 1615 may be performed by a reference signal component 935 as described herein with reference to FIG. 9.

At 1620, the method may include computing a first set of CSI parameters for the first codebook based on the one or more CSI-RSs and in accordance with the first set of codebook parameters. The operations of 1620 may be performed in accordance with examples as disclosed herein. In some examples, aspects of the operations of 1620 may be performed by a reference signal component 935 as described herein with reference to FIG. 9.

At 1625, the method may include computing a second set of CSI parameters for the second codebook based on the one or more CSI-RSs and in accordance with the second set of codebook parameters. The operations of 1625 may be performed in accordance with examples as disclosed herein. In some examples, aspects of the operations of 1625 may be performed by a reference signal component 935 as described herein with reference to FIG. 9.

At 1630, the method may include transmitting, via a CSI report, the first set of CSI parameters for the first codebook and the second set of CSI parameters for the second codebook based on the first set of codebook parameters, the second set of codebook parameters, and the CSI computation at the UE. The operations of 1630 may be performed in accordance with examples as disclosed herein. In some examples, aspects of the operations of 1630 may be performed by a report component 925 as described herein with reference to FIG. 9.

FIG. 17 shows a flowchart illustrating a method 1700 that supports CSI codebook parameter configuration for dynamic antenna port adaptation in accordance with one or more aspects of the present disclosure. The operations of the method 1700 may be implemented by a network entity or its components as described herein. For example, the operations of the method 1700 may be performed by a network entity as described herein with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1705, the method may include transmitting, via a control message, a CSI report configuration including a first set of codebook parameters associated with at least a first codebook, the first codebook associated with a CSI measurement at a user equipment. The operations of 1705 may be performed in accordance with examples as disclosed herein. In some examples, aspects of the operations of 1705 may be performed by a configuration component 1325 as described herein with reference to FIG. 13.

At 1710, the method may include receiving, via a CSI report, a respective set of CSI parameters for each of the first codebook and a second codebook based at least in part on the first set of codebook parameters, a second set of codebook parameters associated with the second codebook, and a CSI computation. The operations of 1710 may be performed in accordance with examples as disclosed herein. In some examples, aspects of the operations of 1710 may be performed by a CSI component 1330 as described herein with reference to FIG. 13.

The following provides an overview of aspects of the present disclosure:

Aspect 1: A method for wireless communication at a UE, comprising: receiving, via a control message, a CSI report configuration comprising a first set of codebook parameters associated with at least a first codebook, the first codebook associated with a CSI measurement at the UE; determining a second set of codebook parameters associated with a second codebook based at least in part on the first set of codebook parameters associated with the first codebook; and transmitting, via a CSI report, a respective set of CSI parameters for each of the first codebook and the second codebook based at least in part on the first set of codebook parameters, the second set of codebook parameters, and a CSI computation at the UE.

Aspect 2: The method of aspect 1, wherein transmitting the respective sets of CSI parameters comprises: transmitting, via the CSI report, a first set of CSI parameters comprising first wideband CSI parameters associated with the first codebook and first subband CSI parameters associated with the first codebook; and transmitting, via the CSI report, a second set of CSI parameters comprising second wideband CSI parameters associated with the second codebook, wherein the first set of CSI parameters and the second set of CSI parameters comprise at least CQI parameters, PMI parameters, or both.

Aspect 3: The method of aspect 2, further comprising: receiving a control signal that indicates the first codebook is a base codebook, wherein transmitting both the first wideband CSI parameters and the first subband CSI parameters associated with the first codebook is based at least in part on the indication that the first codebook is the base codebook.

Aspect 4: The method of aspect 2, further comprising: determining that the first codebook is a base codebook based at least in part on a first quantity of antenna ports associated with the first codebook, a second quantity of antenna ports associated with the second codebook, and a rule for base codebook selection, wherein transmitting both the first wideband CSI parameters and the first subband CSI parameters associated with the first codebook is based at least in part on the first codebook being the base codebook.

Aspect 5: The method of aspect 2, further comprising: determining that the first codebook is a base codebook based at least in part on the first codebook being associated with a CSI-RS resource in a CSI-RS resource set indicated via the CSI report configuration, wherein transmitting both the first wideband CSI parameters and the first subband CSI parameters associated with the first codebook is based at least in part on the first codebook being the base codebook.

Aspect 6: The method of aspect 1, wherein transmitting the respective sets of CSI parameters comprises: transmitting, via the CSI report, a respective set of wideband CSI parameters for each of the first codebook and the second codebook, wherein the respective sets of wideband CSI parameters comprise at least CQI parameters, PMI parameters, or both.

Aspect 7: The method of aspect 1, wherein transmitting the respective sets of CSI parameters comprises: transmitting, via the CSI report, a respective set of subband CSI parameters and a respective set of wideband CSI parameters for each of the first codebook and the second codebook, wherein the respective sets of subband CSI parameters and the respective sets of wideband CSI parameters comprise at least CQI parameters, PMI parameters, or both.

Aspect 8: The method of any of aspects 1 through 7, wherein determining the second set of codebook parameters comprises: determining the second set of codebook parameters based at least in part on the first set of codebook parameters associated with the first codebook and a rule for codebook parameter adaptation.

Aspect 9: The method of aspect 8, wherein the first set of codebook parameters comprises a first antenna port configuration and a first PMI restriction parameter, and wherein determining the second set of codebook parameters comprises: determining a second PMI restriction parameter associated with the second codebook based at least in part on the rule for codebook parameter adaptation, wherein the rule for codebook parameter adaptation is based at least in part on the first PMI restriction parameter, the first antenna port configuration, and a second antenna port configuration associated with the second codebook.

Aspect 10: The method of any of aspects 8 through 9, wherein the first set of codebook parameters comprises a first antenna port configuration and a first rank restriction parameter, and wherein determining the second set of codebook parameters comprises: determining a second rank restriction parameter associated with the second codebook based at least in part on the rule for codebook parameter adaptation, wherein the rule for codebook parameter adaptation is based at least in part on the first rank restriction parameter, the first antenna port configuration, and a second antenna port configuration associated with the second codebook.

Aspect 11: The method of any of aspects 1 through 10, wherein determining the second set of codebook parameters comprises: determining the second set of codebook parameters based at least in part on an indication of the second set of codebook parameters in the CSI report configuration, wherein the CSI report configuration comprises a plurality of sets of codebook parameters associated with a plurality of codebooks, the plurality of sets of codebook parameters comprising at least the first set of codebook parameters associated with the first codebook and the second set of codebook parameters associated with the second codebook.

Aspect 12: The method of any of aspects 1 through 11, wherein: the first set of codebook parameters comprises a first antenna port configuration, a first PMI restriction, and a first rank restriction for the first codebook; and the second set of codebook parameters comprises a second antenna port configuration, a second PMI restriction, and a second rank restriction for the second codebook.

Aspect 13: The method of any of aspects 1 through 12, further comprising: receiving one or more CSI-RSs associated with the CSI computation at the UE; computing a first set of CSI parameters for the first codebook based at least in part on the one or more CSI-RSs and in accordance with the first set of codebook parameters; and computing a second set of CSI parameters for the second codebook based at least in part on the one or more CSI-RSs and in accordance with the second set of codebook parameters, wherein the CSI report comprises the first set of CSI parameters and the second set of CSI parameters.

Aspect 14: A method for wireless communication at a network entity, comprising: transmitting, via a control message, a CSI report configuration comprising a first set of codebook parameters associated with at least a first codebook, the first codebook associated with a CSI measurement at a UE; and receiving, via a CSI report, a respective set of CSI parameters for each of the first codebook and a second codebook based at least in part on the first set of codebook parameters, a second set of codebook parameters associated with the second codebook, and a CSI computation.

Aspect 15: The method of aspect 14, wherein receiving the respective sets of CSI parameters comprises: receiving, via the CSI report, a first set of CSI parameters comprising first wideband CSI parameters associated with the first codebook and first subband CSI parameters associated with the first codebook; and receiving, via the CSI report, a second set of CSI parameters comprising second wideband CSI parameters associated with the second codebook, wherein the first set of CSI parameters and the second set of CSI parameters each comprise at least CQI parameters, PMI parameters, or both.

Aspect 16: The method of aspect 15, further comprising: transmitting a control signal that indicates the first codebook is a base codebook, wherein receiving both the first wideband CSI parameters and the first subband CSI parameters associated with the first codebook is based at least in part on the first codebook being the base codebook.

Aspect 17: The method of aspect 14, wherein receiving the respective sets of CSI parameters comprises: receiving, via the CSI report, a respective set of wideband CSI parameters for each of the first codebook and the second codebook, wherein the respective sets of wideband CSI parameters comprises at least CQI parameters, PMI parameters, or both.

Aspect 18: The method of aspect 14 through 17, wherein receiving the respective sets of CSI parameters comprises: receiving, via the CSI report, a respective set of subband CSI parameters and a respective set of wideband CSI parameters for each of the first codebook and the second codebook, wherein the respective sets of subband CSI parameters and the respective sets of wideband CSI parameters comprise at least CQI parameters, PMI parameters, or both.

Aspect 19: The method of any of aspects 14 through 18, wherein transmitting the CSI report configuration comprises: transmitting, via the CSI report configuration, a plurality of sets of codebook parameters associated with a plurality of codebooks, wherein the plurality of sets of codebook parameters comprise at least the first set of codebook parameters associated with the first codebook and the second set of codebook parameters associated with the second codebook.

Aspect 20: The method of any of aspects 14 through 19, further comprising: transmitting one or more CSI-RSs associated with the CSI computation, wherein receiving the CSI report is based at least in part on the one or more CSI-RSs.

Aspect 21: The method of any of aspects 14 through 20, wherein the first set of codebook parameters comprises a first antenna port configuration, a first PMI restriction, and a first rank restriction for the first codebook; and the second set of codebook parameters comprises a second antenna port configuration, a second PMI restriction, and a second rank restriction for the second codebook.

Aspect 22: An apparatus for wireless communication at a UE, comprising a processor; memory coupled with the processor; and instructions stored in the memory and executable by the processor to cause the apparatus to perform a method of any of aspects 1 through 13.

Aspect 23: An apparatus for wireless communication at a UE, comprising at least one means for performing a method of any of aspects 1 through 13.

Aspect 24: A non-transitory computer-readable medium storing code for wireless communication at a UE, the code comprising instructions executable by a processor to perform a method of any of aspects 1 through 13.

Aspect 25: An apparatus for wireless communication at a network entity, comprising a processor; memory coupled with the processor; and instructions stored in the memory and executable by the processor to cause the apparatus to perform a method of any of aspects 14 through 21.

Aspect 26: An apparatus for wireless communication at a network entity, comprising at least one means for performing a method of any of aspects 14 through 21.

Aspect 27: A non-transitory computer-readable medium storing code for wireless communication at a network entity, the code comprising instructions executable by a processor to perform a method of any of aspects 14 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:

receiving, via a control message, a channel state information report configuration comprising a first set of codebook parameters associated with at least a first codebook, the first codebook associated with a channel state information measurement at the UE;

determining a second set of codebook parameters associated with a second codebook based at least in part on the first set of codebook parameters associated with the first codebook; and transmitting, via a physical uplink control channel, a channel state information report that comprises a respective set of subband channel state information parameters and a respective set of wideband channel state information parameters for each of the first codebook and the second codebook based at least in part on the first set of codebook parameters, the second set of codebook parameters, and a channel state information computation at the UE.

2. The method of claim 1, wherein transmitting the respective sets of subband channel state information parameters and the respective sets of wideband channel state information parameters comprises:

transmitting, via the channel state information report, a first set of channel state information parameters comprising first wideband channel state information parameters associated with the first codebook and first subband channel state information parameters associated with the first codebook; and transmitting, via the channel state information report, a second set of channel state information parameters comprising second wideband channel state information parameters associated with the second codebook, wherein the first set of channel state information parameters and the second set of channel state information parameters comprise at least channel quality indicator parameters, precoding matrix indicator parameters, or both.

3. The method of claim 2, further comprising:

receiving a control signal that indicates the first codebook is a base codebook, wherein transmitting both the first wideband channel state information parameters and the first subband channel state information parameters associated with the first codebook is based at least in part on the indication that the first codebook is the base codebook.

4. The method of claim 2, further comprising:

determining that the first codebook is a base codebook based at least in part on a first quantity of antenna ports associated with the first codebook, a second quantity of antenna ports associated with the second codebook, and a rule for base codebook selection, wherein transmitting both the first wideband channel state information parameters and the first subband channel state information parameters associated with the first codebook is based at least in part on the first codebook being the base codebook.

5. The method of claim 2, further comprising:

determining that the first codebook is a base codebook based at least in part on the first codebook being associated with a channel state information reference signal resource in a channel state information reference signal resource set indicated via the channel state information report configuration, wherein transmitting both the first wideband channel state information parameters and the first subband channel state information parameters associated with the first codebook is based at least in part on the first codebook being the base codebook.

6. The method of claim 1, wherein the respective sets of wideband channel state information parameters comprise at least channel quality indicator parameters, precoding matrix indicator parameters, or both.

7. The method of claim 1, wherein the respective sets of subband channel state information parameters and the respective sets of wideband channel state information parameters comprise at least channel quality indicator parameters, precoding matrix indicator parameters, or both.

8. The method of claim 1, wherein determining the second set of codebook parameters comprises:

determining the second set of codebook parameters based at least in part on the first set of codebook parameters associated with the first codebook and a rule for codebook parameter adaptation.

9. The method of claim 8, wherein the first set of codebook parameters comprises a first antenna port configuration and a first precoding matrix indicator restriction parameter, and wherein determining the second set of codebook parameters comprises:

determining a second precoding matrix indicator restriction parameter associated with the second codebook based at least in part on the rule for codebook parameter adaptation, wherein the rule for codebook parameter adaptation is based at least in part on the first precoding matrix indicator restriction parameter, the first antenna port configuration, and a second antenna port configuration associated with the second codebook.

10. The method of claim 8, wherein the first set of codebook parameters comprises a first antenna port configuration and a first rank restriction parameter, and wherein determining the second set of codebook parameters comprises:

determining a second rank restriction parameter associated with the second codebook based at least in part on the rule for codebook parameter adaptation, wherein the rule for codebook parameter adaptation is based at least in part on the first rank restriction parameter, the first antenna port configuration, and a second antenna port configuration associated with the second codebook.

11. The method of claim 1, wherein determining the second set of codebook parameters comprises:

determining the second set of codebook parameters based at least in part on an indication of the second set of codebook parameters in the channel state information report configuration, wherein the channel state information report configuration comprises a plurality of sets of codebook parameters associated with a plurality of codebooks, the plurality of sets of codebook parameters comprising at least the first set of codebook parameters associated with the first codebook and the second set of codebook parameters associated with the second codebook.

12. The method of claim 1, wherein:

the first set of codebook parameters comprises a first antenna port configuration, a first precoding matrix indicator restriction, and a first rank restriction for the first codebook; and the second set of codebook parameters comprises a second antenna port configuration, a second precoding matrix indicator restriction, and a second rank restriction for the second codebook.

13. The method of claim 1, further comprising:

receiving one or more channel state information reference signals associated with the channel state information computation at the UE;

computing a first set of channel state information parameters for the first codebook based at least in part on the one or more channel state information reference signals and in accordance with the first set of codebook parameters; and computing a second set of channel state information parameters for the second codebook based at least in part on the one or more channel state information reference signals and in accordance with the second set of codebook parameters, wherein the channel state information report comprises the first set of channel state information parameters and the second set of channel state information parameters.

14. A method for wireless communication at a network entity, comprising:

transmitting, via a control message, a channel state information report configuration comprising a first set of codebook parameters associated with at least a first codebook, the first codebook associated with a channel state information measurement at a user equipment; and receiving, via a physical uplink control channel, a channel state information report that comprises a respective set of subband channel state information parameters and a respective set of wideband channel state information parameters for each of the first codebook and a second codebook based at least in part on the first set of codebook parameters, a second set of codebook parameters associated with the second codebook, and a channel state information computation.

15. The method of claim 14, wherein receiving the respective sets of subband channel state information parameters and the respective sets of wideband channel state information parameters comprises:

receiving, via the channel state information report, a first set of channel state information parameters comprising first wideband channel state information parameters associated with the first codebook and first subband channel state information parameters associated with the first codebook; and receiving, via the channel state information report, a second set of channel state information parameters comprising second wideband channel state information parameters associated with the second codebook, wherein the first set of channel state information parameters and the second set of channel state information parameters each comprise at least channel quality indicator parameters, precoding matrix indicator parameters, or both.

16. The method of claim 15, further comprising:

transmitting a control signal that indicates the first codebook is a base codebook, wherein receiving both the first wideband channel state information parameters and the first subband channel state information parameters associated with the first codebook is based at least in part on the first codebook being the base codebook.

17. The method of claim 14, wherein the respective sets of wideband channel state information parameters comprises at least channel quality indicator parameters, precoding matrix indicator parameters, or both.

18. The method of claim 14, wherein the respective sets of subband channel state information parameters and the respective sets of wideband channel state information parameters comprise at least channel quality indicator parameters, precoding matrix indicator parameters, or both.

19. The method of claim 14, wherein transmitting the channel state information report configuration comprises:

transmitting, via the channel state information report configuration, a plurality of sets of codebook parameters associated with a plurality of codebooks, wherein the plurality of sets of codebook parameters comprise at least the first set of codebook parameters associated with the first codebook and the second set of codebook parameters associated with the second codebook.

20. The method of claim 14, further comprising:

transmitting one or more channel state information reference signals associated with the channel state information computation, wherein receiving the channel state information report is based at least in part on the one or more channel state information reference signals.

21. The method of claim 14, wherein:

the first set of codebook parameters comprises a first antenna port configuration, a first precoding matrix indicator restriction, and a first rank restriction for the first codebook; and the second set of codebook parameters comprises a second antenna port configuration, a second precoding matrix indicator restriction, and a second rank restriction for the second codebook.

22. An apparatus for wireless communication at a user equipment (UE), comprising:

at least one processor; and at least one memory coupled with the at least one processor, with instructions stored in the at least one memory, the instructions being executable by the at least one processor to cause the apparatus to:

receive, via a control message, a channel state information report configuration comprising a first set of codebook parameters associated with at least a first codebook, the first codebook associated with a channel state information measurement at the UE;

determine a second set of codebook parameters associated with a second codebook based at least in part on the first set of codebook parameters associated with the first codebook; and transmit, via a physical uplink control channel, a channel state information report that comprises a respective set of subband channel state information parameters and a respective set of wideband channel state information parameters for each of the first codebook and the second codebook based at least in part on the first set of codebook parameters, the second set of codebook parameters, and a channel state information computation at the UE.

23. The apparatus of claim 22, wherein the instructions to transmit the respective sets of subband channel state information parameters and the respective sets of wideband channel state information parameters are executable by the at least one processor to cause the apparatus to:

transmit, via the channel state information report, a first set of channel state information parameters comprising first wideband channel state information parameters associated with the first codebook and first subband channel state information parameters associated with the first codebook; and transmit, via the channel state information report, a second set of channel state information parameters comprising second wideband channel state information parameters associated with the second codebook, wherein the first set of channel state information parameters and the second set of channel state information parameters comprise at least channel quality indicator parameters, precoding matrix indicator parameters, or both.

24. The apparatus of claim 23, wherein the instructions are further executable by the at least one processor to cause the apparatus to:

receive a control signal that indicates the first codebook is a base codebook, wherein transmitting both the first wideband channel state information parameters and the first subband channel state information parameters associated with the first codebook is based at least in part on the indication that the first codebook is the base codebook.

25. The apparatus of claim 23, wherein the instructions are further executable by the at least one processor to cause the apparatus to:

determine that the first codebook is a base codebook based at least in part on a first quantity of antenna ports associated with the first codebook, a second quantity of antenna ports associated with the second codebook, and a rule for base codebook selection, wherein transmitting both the first wideband channel state information parameters and the first subband channel state information parameters associated with the first codebook is based at least in part on the first codebook being the base codebook.

26. The apparatus of claim 23, wherein the instructions are further executable by the at least one processor to cause the apparatus to:

determine that the first codebook is a base codebook based at least in part on the first codebook being associated with a channel state information reference signal resource in a channel state information reference signal resource set indicated via the channel state information report configuration, wherein transmitting both the first wideband channel state information parameters and the first subband channel state information parameters associated with the first codebook is based at least in part on the first codebook being the base codebook.

27. The apparatus of claim 22, wherein the respective sets of wideband channel state information parameters comprise at least channel quality indicator parameters, precoding matrix indicator parameters, or both.

28. An apparatus for wireless communication at a network entity, comprising:

at least one processor; and at least one memory coupled with the at least one processor, with instructions stored in the at least one memory, the instructions being executable by the at least one processor to cause the apparatus to:

transmit, via a control message, a channel state information report configuration comprising a first set of codebook parameters associated with at least a first codebook, the first codebook associated with a channel state information measurement at a user equipment; and receive, via a physical control channel, a channel state information report that comprises a respective set of subband channel state information parameters and a respective set of wideband channel state information parameters for each of the first codebook and a second codebook based at least in part on the first set of codebook parameters, a second set of codebook parameters associated with the second codebook, and a channel state information computation.

29. The apparatus of claim 28, wherein the instructions to receive the respective sets of subband channel state information parameters and the respective sets of wideband channel state information parameters are executable by the at least one processor to cause the apparatus to:

receive, via the channel state information report, a first set of channel state information parameters comprising first wideband channel state information parameters associated with the first codebook and first subband channel state information parameters associated with the first codebook; and receive, via the channel state information report, a second set of channel state information parameters comprising second wideband channel state information parameters associated with the second codebook, wherein the first set of channel state information parameters and the second set of channel state information parameters each comprise at least channel quality indicator parameters, precoding matrix indicator parameters, or both.

30. The apparatus of claim 28, wherein the respective sets of wideband channel state information parameters comprises at least channel quality indicator parameters, precoding matrix indicator parameters, or both.

\* \* \* \* \*